(12) United States Patent  
Zayats et al.

(10) Patent No.: US 12,450,101 B2
(45) Date of Patent: Oct. 21, 2025

(54) TECHNIQUES FOR SECURE INTRA-NODE COMMUNICATION BETWEEN EDGE DEVICES

(71) Applicant: Oracle International Corporation, Redwood Shores, CA (US)

(72) Inventors: Aliaksei Zayats, Atlanta, GA (US); Igors Sajenko, Cumming, GA (US)

(73) Assignee: Oracle International Corporation, Redwood Shores, CA (US)

( * ) Notice: Subject to any disclaimer, the term of this patent is extended or adjusted under 35 U.S.C. 154(b) by 296 days.

(21) Appl. No.: 17/549,859

(22) Filed: Dec. 13, 2021

(65) Prior Publication Data

US 2022/0329628 A1    Oct. 13, 2022

Related U.S. Application Data

(60) Provisional application No. 63/173,244, filed on Apr. 9, 2021.

(51) Int. Cl.
*G06F 9/50* (2006.01)
*G06F 9/455* (2018.01)
(Continued)

(52) U.S. Cl.
CPC ............ *G06F 9/5077* (2013.01); *G06F 9/455* (2013.01); *G06F 9/5005* (2013.01);
(Continued)

(58) Field of Classification Search
CPC ............... H04L 41/0806; H04L 9/0897; H04L 63/0471; H04L 63/0478; H04L 63/0485;
(Continued)

(56) References Cited

U.S. PATENT DOCUMENTS 10,880,743 B1 * 12/2020 Berzin ................ H04L 41/0806
11,050,781 B2    6/2021 Samuel et al.
(Continued)

FOREIGN PATENT DOCUMENTS

CN     112543429 B  *  4/2022  .......... G06N 3/0454
EP        2369782         9/2011
(Continued)

OTHER PUBLICATIONS

AWS Snowball Edge Developer Guide AWS Snowball Edge, Available Online at: https://docs.aws.amazon.com/snowball/latest/developer-guide/AWSSnowball-dg.pdf#UsingCluster, 2021, 227 pages.
(Continued)

*Primary Examiner* — Dereena T Cattungal
(74) *Attorney, Agent, or Firm* — Kilpatrick Townsend & Stockton LLP

(57) ABSTRACT

Techniques are described for implementing secure communications between edge devices providing cloud computing services in an edge environment. A computing cluster can include a plurality of cloud-computing edge devices. The computing cluster can implement a distributed control plane for performing operations related to managing cloud infrastructure resources within the computing cluster. The cloud-computing edge devices can be connected to an intra-node switch to form a substrate network. The data related to control plane operations may be transmitted over the substrate from one edge device to another, such that control plane operations can be performed at any suitable edge device in the cluster. The edge devices can use an encryption protocol to encrypt the data transmitted over the substrate network via the intra-node switch.

20 Claims, 12 Drawing Sheets

(51) Int. Cl.
*G06F 11/34* (2006.01)
*H04L 41/50* (2022.01)

(52) U.S. Cl.
CPC ...... *G06F 11/3409* (2013.01); *G06F 11/3414* (2013.01); *G06F 11/3433* (2013.01); *G06F 11/3457* (2013.01); *G06F 2009/45562* (2013.01); *G06F 2009/45587* (2013.01); *H04L 41/50* (2013.01)

(58) Field of Classification Search
CPC ... H04L 63/06; H04L 63/0876; H04L 63/162; H04L 63/20; H04L 67/10; H04L 41/5048; H04L 41/5051; G06F 3/0604; G06F 3/0622; G06F 3/0655; G06F 3/0659; G06F 3/067; G06F 3/0679; G06F 8/61; G06F 8/658; G06F 9/4406; G06F 9/45558; G06F 9/505; G06F 9/5055; G06F 9/5077; G06F 9/5088; G06F 11/1451; G06F 11/1469; G06F 2009/45562; G06F 2009/45587; G06F 2009/45595; G06F 2201/84
USPC ........................................................ 713/151
See application file for complete search history.

(56) References Cited

U.S. PATENT DOCUMENTS

| | | | |
|---|---|---|---|
| 11,201,789 B1 | 12/2021 | Keane et al. | |
| 11,452,054 B2* | 9/2022 | Tang | H04W 56/001 |
| 11,582,027 B1* | 2/2023 | Lawton | H04L 9/0891 |
| 2004/0252717 A1 | 12/2004 | Solomon et al. | |
| 2016/0266922 A1 | 9/2016 | Brandwine et al. | |
| 2017/0201455 A1* | 7/2017 | Amulothu | H04L 45/7453 |
| 2018/0004953 A1 | 1/2018 | Smith, II et al. | |
| 2018/0054490 A1* | 2/2018 | Wadhwa | G08G 1/0129 |
| 2019/0138294 A1 | 5/2019 | Smith et al. | |
| 2019/0253262 A1 | 8/2019 | Smith et al. | |
| 2019/0327312 A1* | 10/2019 | Gupta | H04L 67/148 |
| 2020/0097274 A1 | 3/2020 | Sarkar et al. | |
| 2020/0103888 A1* | 4/2020 | Sayyarrodsari | G05B 17/02 |
| 2020/0153623 A1* | 5/2020 | Asanghanwa | H04L 9/3213 |
| 2020/0213227 A1 | 7/2020 | Pianigiani et al. | |
| 2020/0293477 A1* | 9/2020 | Lefebvre | G06F 13/385 |
| 2020/0296138 A1 | 9/2020 | Crabtree et al. | |
| 2020/0344847 A1* | 10/2020 | Nardini | H04W 84/18 |
| 2020/0351380 A1* | 11/2020 | Fedorov | H04W 4/70 |
| 2021/0014113 A1 | 1/2021 | Guim Bernat et al. | |
| 2021/0112034 A1 | 4/2021 | Sundararajan et al. | |
| 2021/0132976 A1 | 5/2021 | Chandrappa et al. | |
| 2021/0168203 A1* | 6/2021 | Parulkar | H04L 41/40 |
| 2021/0256824 A1* | 8/2021 | Wyseur | G08B 13/19667 |
| 2021/0314423 A1 | 10/2021 | Rolando et al. | |
| 2022/0019422 A1* | 1/2022 | Anderson | H04L 67/10 |
| 2022/0051762 A1* | 2/2022 | Sharma | G16H 10/60 |
| 2022/0083245 A1 | 3/2022 | Kant et al. | |
| 2022/0100182 A1* | 3/2022 | Mehrotra | G05B 19/41885 |
| 2022/0329628 A1 | 10/2022 | Zayats et al. | |
| 2022/0334725 A1 | 10/2022 | Mertes et al. | |
| 2022/0405157 A1* | 12/2022 | Bender | G06F 9/546 |
| 2022/0413974 A1 | 12/2022 | Wang et al. | |
| 2023/0254943 A1* | 8/2023 | Nardini | H04W 4/00 370/328 |
| 2023/0283517 A1* | 9/2023 | Maheshwari | H04L 63/20 711/154 |
| 2024/0171391 A1* | 5/2024 | Ananthanarayanan | H04W 12/10 |

FOREIGN PATENT DOCUMENTS

| | | |
|---|---|---|
| EP | 3391588 | 10/2018 |
| WO | 2016069638 | 5/2016 |
| WO | 2019236181 | 12/2019 |
| WO | 2020052322 | 3/2020 |

OTHER PUBLICATIONS

Cisco SD-WAN Design Guide, Available Online at: https://www.cisco.com/c/en/us/td/docs/solutions/CVD/SDWAN/cisco-sdwan-design-guide.html, Sep. 2020, 102 pages.
Device Update APT Manifest, Available Online at: https://docs.microsoft.com/en-US/azure/iot-hub-device-update/device-update-apt-manifest, Feb. 17, 2021, 2 pages.
Encrypting Traffic Between Nodeswith IPsec, Available Online at: https://docs.openshift.com/container-platform/3.11/admin_guide/ipsec.html, Accessed from Internet on May 21, 2021, 8 pages.
NSX-T Data Center, Available Online at: https://docs.vmware.com/en/VMware-NSX-T-Data-Center/2.5/nsxt_25_install.pdf, Jul. 31, 2020, 276 pages.
Software Installation and Upgrade for vEdge Routers, Available Online at: https://www.cisco.com/c/en/us/td/docs/routers/sdwan/configuration/sdwan-xe-gs-book/hardware-and-software-installation.html, 2021, 2 pages.
Upgrade an Edge Cluster, Available Online at: https://partners-intl.aliyun.com/help/doc-detail/154532.htm, 2021, 4 pages.
Upgrade NSX Edge Cluster, Available Online at: https://docs.vmware.com/en/VMware-NSX-T-Data-Center/3.1/nsxt_31_upgrade.pdf, 2021, pp. 1-57.
Akesson et al., How to Build a Resilient Over-the-Air Update Solution, Available Online at: https://techcommunity.microsoft.com/t5/internet-of-things/how-to-build-a-resilient-over-the-air-update-solution/ba-p/2163991, Mar. 2, 2021, 4 pages.
Asif et al., Prototype Implementation of Edge Encryption in IoT Architecture, 10th International Conference on Computing, Communication and Networking Technologies, Jul. 6-8, 2019, 7 pages.
Pavlik, Managing Thousands of Edge Kubernetes Clusterswith GitOps, Available Online at: https://www.volterra.io/resources/blog/managing-thousands-of-edge-kubernetes-clusters-with-gitops, Dec. 18, 2019, 8 pages.
U.S. Appl. No. 17/581,802, Non-Final Office Action mailed on Feb. 13, 2024, 24 pages.
U.S. Appl. No. 17/581,802, Corrected Notice of Allowability mailed on Apr. 15, 2025, 18 pages.
U.S. Appl. No. 17/581,802, Final Office Action mailed on Oct. 15, 2024, 36 pages.
U.S. Appl. No. 17/581,802, Notice of Allowance mailed on Apr. 2, 2025, 22 pages.

* cited by examiner

TECHNIQUES FOR SECURE INTRA-NODE COMMUNICATION BETWEEN EDGE DEVICES

CROSS-REFERENCE TO RELATED APPLICATIONS

This non-provisional application claims priority to U.S. Patent Application No. 63/173,244, filed on Apr. 9, 2021, entitled "Cloud Computing Edge Computing Device (Rover)," the disclosure of which is herein incorporated by reference in its entirety for all purposes.

BACKGROUND

In cloud computing, processing and storage is generally performed by one or more service providers implemented at a centralized location. Data can be received from customers at the centralized location, processed there, and then the processed (or other) data can be transmitted back to customers. However, having a centralized location for cloud infrastructure components may not be ideal in various scenarios. For example, when there are hundreds or thousands of Internet of Things (IoT) devices transmitting data to the central servers, and especially when those IoT devices are not geographically close to the cloud infrastructure computing devices, conventional centralized systems are not ideal. These IoT devices may be considered on the "edge," as in they are not close to the central servers.

Additionally, there may be other instances when the centralized location for cloud components is less than ideal. For example, if the data is collected (e.g., by IoT devices) in a disconnected region or a location with no Internet connectivity (e.g., remote locations). Current centralized cloud computing environments may not meet time sensitivity requirements when streaming data due to the inherent latency of their wide-area network connections. Remotely generated data may need to be processed more quickly (e.g., to detect anomalies) than conventional centralized cloud computing systems allow. Thus, there are challenges with managing a traditional cloud computing environment that relies on centralized components.

BRIEF SUMMARY

Embodiments of the present disclosure relate to providing secure communication channels between devices providing cloud computing or other distributed computing services at an "edge" location. In particular, a distributed computing cluster can be composed of a plurality of cloud-computing edge devices that collectively provide cloud-computing infrastructure and related services outside a traditional cloud environment. Some embodiments provide a method, a computing cluster, and a computer-readable medium that implement a distributed control plane among the plurality of cloud-computing edge devices. The distributed control plane may be responsible for managing and provisioning cloud infrastructure resources among the edge devices in a similar manner as a traditional cloud-computing control plane. However, because the edge devices may be located outside of the secure physical environment of traditional cloud-computing resources (e.g., secure data centers), embodiments of the present disclosure provide techniques for providing secure communication between the edge devices while the edge devices execute distributed control plane operations.

One embodiment is directed to a method performed by a computing cluster that includes a plurality of cloud-computing edge devices. The method may include implementing a distributed control plane. The distributed control plane may include control plane processes executing on some or all of the edge devices in the computing cluster. The edge devices can be communicatively connected to one another via an intra-node switch. For example, each edge device may be physically connected to the intra-node switch via a communication cable (e.g., an Ethernet cable). Each edge device may be individually configured to encrypt data transmitted via the intra-node switch. For example, each edge device may be configured to implement a MACsec protocol to encrypt data frames sent to other edge devices via the intra-node switch. The method can also include generating a message comprising data related to control plane operations. The message may be generated by a first cloud-computing edge device of the distributed control plane. The method may further include generating an encrypted message from the message that contains the data related to the control plane operations. The encrypted message may be generated based at least in part on an encryption protocol (e.g., MACsec). The method can also include transmitting the encrypted message to a second cloud-computing edge device via the intra-node switch.

In some embodiments, the method further includes decrypting the encrypted message by the second cloud-computing edge device to obtain the data related to control plane operations. The second cloud-computing edge device can perform control plane operations based on the decrypted data.

In some embodiments, the plurality of cloud-computing edge devices are communicatively connected to a client switch. The client switch may provide a connection to a network (e.g., the Internet, a public network, etc.) separate from the network created via the intra-node switch. The method may also include receiving, from the client switch at the first cloud-computing edge device, an additional message initiated from a client device. The additional message can be encrypted with a second encryption protocol. In some embodiments, the second encryption protocol is different from the first encryption protocol. The method also includes decrypting, by the first cloud-computing edge device and using the second encryption protocol, the additional message to obtain message data, and executing one or more operations based at least in part on the message data obtained. For example, the additional message may be a client request to perform a workflow at the computing cluster. In response, the computing cluster may execute the workflow operations on one or more of the cloud-computing edge devices.

In some embodiments, generating the encrypted message includes encrypting the message using a data encryption key. The data encryption key may be stored in a key storage at the first cloud-computing edge device and encrypted with a third encryption protocol. This third encryption protocol may include a master key (e.g., a private key of a public/private key pair), which is in turn stored at the first cloud-computing edge device (e.g., at a trusted platform module). Each of the plurality of edge devices in the computing cluster may include its own trusted platform module storing a master key for decrypting stored keys on the respective edge device. The method may further include retrieving, by the first cloud-computing edge device, the data encryption key from the key storage and decrypting (e.g., by the trusted platform module) the data encryption key using the master key.

Another embodiment is directed to a computing cluster that includes an intra-node switch and a plurality of cloud-computing edge devices communicatively connected to the intra-node switch and configured with one or more processors and one or more memories storing computer-executable instructions that, when executed by the one or more processors, cause the computing cluster to perform the method described in the preceding paragraphs.

Still another embodiment is directed to a non-transitory computer-readable medium storing computer-executable instructions that, when executed by one or more processors of a computing cluster, cause the computing cluster to perform the methods disclosed herein.

DETAILED DESCRIPTION

Figure 1:
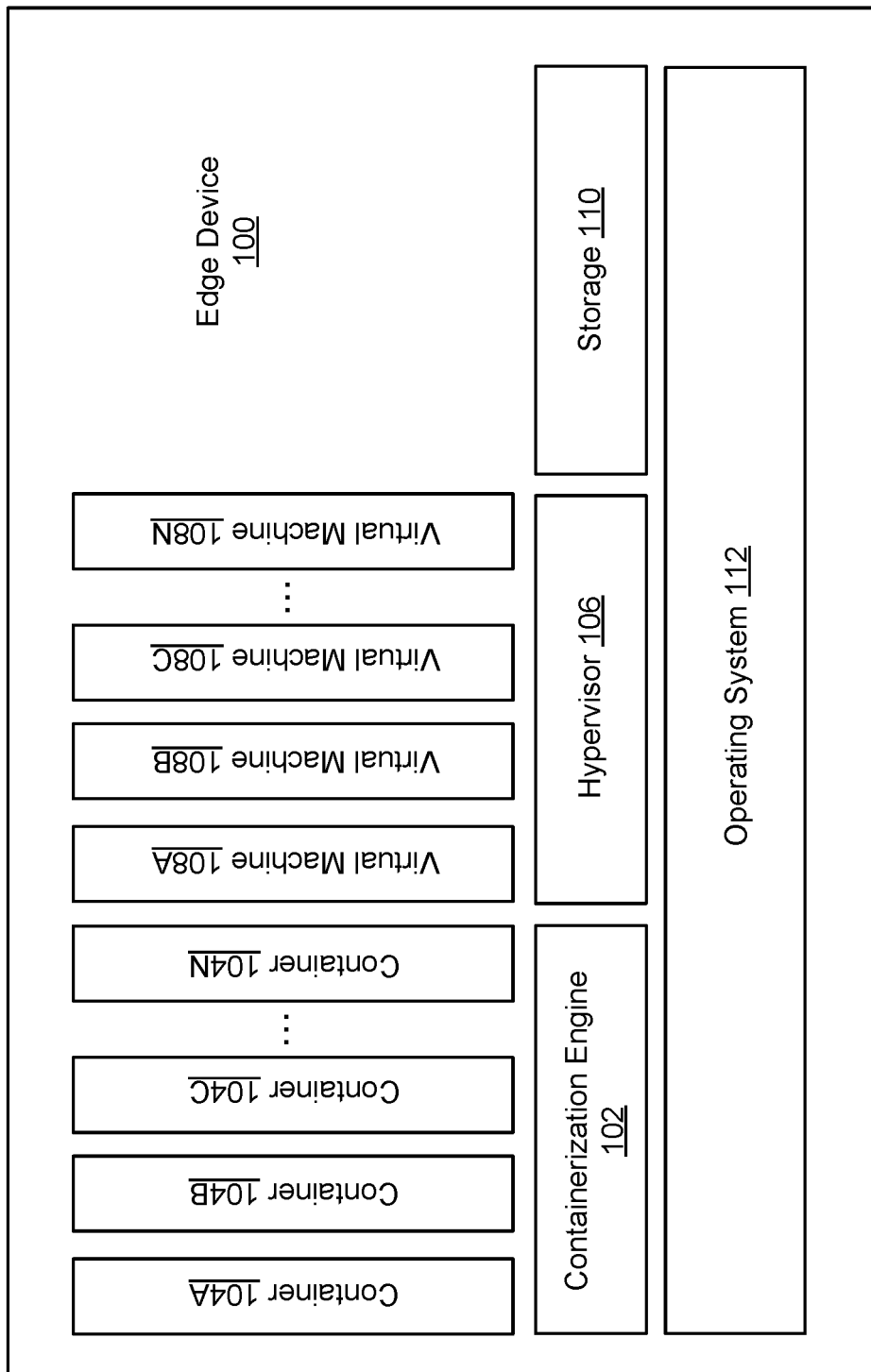
FIG. 1 is a block diagram of an example high-level architecture for a cloud infrastructure edge computing device, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

INTRODUCTION

In some examples, a cloud-integrated edge service (e.g., implemented in an edge computing device) may be integral in addressing the desire to run time-sensitive cloud infrastructure application outside of a centralized data center (e.g., a datacenter of a cloud infrastructure service provider). Such an edge computing device may deliver computing and storage at the edge and/or in disconnected locations (e.g., remote locations separate from the centralized data center and lacking a public/private network connection (e.g., an Internet connection, a VPN connection, a dedicated connection, etc.) to enable low-latency processing at or near the point of data generation and ingestion. In some instances, a fleet of portable (which may be ruggedized for protection) server nodes (e.g., a fleet of edge devices) may be configured to physically bring the cloud infrastructure service to remote locations where cloud technology has been considered technologically infeasible or too cost prohibitive to implement.

To a customer (e.g., a user), the edge computing device can act as an extension of their cloud infrastructure: including virtual machines (VMs), containers, functions and data files, block volumes or object store services can also be delivered from the cloud infrastructure tenancy (e.g., a tenancy of the centralized cloud computing environment) with little to no modifications, and the customer experience may remain unchanged from that of the centralized cloud computing experience. Additionally, the edge computing device may be configured to implement both a control plane and a data plane that are part of a cloud infrastructure service provider. The data plane can be configured to manage data storage, migration, processing, etc., while the control plan can be configured for controlling the various services and architecture components of the computing device. Once the edge computing device is properly connected to a customer computing device (e.g., via a local area network (LAN)), the customer may be able to utilize the IaaS service (or at least a subset of it) using the same SDK and API used with the centralized cloud service.

The edge computing device can be delivered to a customer in a pre-configured form, such that the only action that might be required of the customer is to connect the nodes to a network (e.g., a local/on premise network that is accessible by a user computing device), power them up, and/or log in. The device can be pre-configured in various ways based on customer preference/request, or it can be in one of various configurations (e.g., storage-centric, compute-centric, etc.). The node or cluster of nodes can be portable and is intended to be mobile—when moved and set up again (or used while in motion), the deployment continues to run from where it turned off (or continuously). The edge computing device can also monitor for wide area network (WAN) connection availability (e.g., the Internet or the like), and can synchronize customer and management data with the cloud once connected to a WAN.

Some potential use cases for the edge computing device include: storage and processing, compute and input/output (I/O) intensive applications, machine learning, remote computing, low latency database and analytics, and data collection and migration. More specifically, the edge device can be used for storage and processing of large volumes of images, video, audio, and IoT sensor data generated in environments where WAN connection is latent or unavailable (e.g., in remote areas, an oil off-shore platform, or the like). Once this data is pre-processed, filtered, compressed, and/or secured it may be transported or transferred to the cloud service provider, where it can be further processed by the centralized server (e.g., traditional cloud service provider). The device can also be used for compute and I/O intensive applications, where low latency is paramount, such as tactical reconnaissance or 5G communications. The device can also be used for machine learning, with models trained in the cloud and running in disconnected locations to improve efficiency, intelligence, and/or productivity in manufacturing, document management, transportation, oil and gas mining, and/or telecommunications. It can also be used for remote computing requiring elevated security and airtight containment of data. Additionally, the device can be used for low latency database and analytics workloads, with more applications optimized over time. Further, the device can also be used for data collection and migration of large sets of object and database management system (DBMS) data into a cloud service provider, e.g., at faster speeds and lower cost than a WAN transfer.

The edge device can natively support distributed cloud paradigms, where complex, multi-stage compute workflows can be separated into individual components, which in turn can be deployed to the infrastructure of the edge device, on premise, and/or in the cloud. An example of such distributed workflow is represented in the following scenario. Massive amounts of data can be collected by an edge computing node deployed on an airplane (e.g., a military jet) in a reconnaissance operation with no Internet access (e.g., a disconnected edge computing device), where this data is be pre-processed in near real time by a machine learning model previously trained by the cloud service provider that provided the edge device. Even the first pass of processing the data with the models can detect significant anomalies and can alert personnel immediately—for example, a bridge may be destroyed and therefore the troops should be rerouted. When the airplane lands, the edge computing device can be physically connected to a network (e.g., an edge station potentially deployed at the airstrip). The pre-processed, filtered, smaller dataset can be loaded for final processing to a cluster of edge computing device nodes at the edge station. The original edge computing device can be released and can be loaded on another (or the same) airplane, for example to support the next mission. When processing at the edge station is complete, a 3D map update can be issued for immediate use. Change sets can then be uploaded by the edge station cluster to a datacenter and can be used to build future models providing intelligent tactical forecasts to the reconnaissance operation, or the like.

It should be appreciated that the following techniques may be employed in a variety of contexts such as telecommunications, oil and gas, healthcare, hospitality, agriculture, transportation, and logistics, and the like.

Embodiments described herein address these and other problems, individually and collectively. Specifically, embodiments of the present disclosure provide for a cloud infrastructure edge computing device.

Edge Device Architecture

An edge computing device (sometimes referred to as "a cloud edge device" or an "edge device," for brevity), extends a user's centralized cloud computing tenancy by physically putting customer infrastructure and platform services where data is generated—on the edge, on premise, or completely disconnected. Each deployment is created to address specific customer needs by provisioning VM instance images and data from the customer's centralized cloud tenancy. These workloads remain fully functional offline as the edge device adapts to the connection state, operates in harsh environmental conditions, and is ready to sync with the cloud whenever the connection is re-established.

FIG. 1 is a block diagram of an example high-level architecture for a cloud infrastructure edge computing device (e.g., edge device 100), according to at least one embodiment. An overview of the software and hardware component of the edge device 100 is provided below.

In some examples, the edge device 100 may include containerization engine 102 (e.g., Docker, Kubernetes, etc.) configured to implement one or more containers (e.g., corresponding to service(s) 104A, 104B, 104C, to 104N, collectively referred to as "service(s) 104"). A containerization engine (e.g., the containerization engine 102) may be container-orchestration system for automating computer application deployment, scaling, and management. In some embodiments, the containerization engine may be configured to provide OS-level virtualization to deliver software in packages called containers. These containers can be isolated from one another and utilize respective software, libraries, and configuration files, and can communicate with each other through well-defined channels. In some embodiments, service(s) 104 may include any suitable number of services (e.g., one or more). These services may implement at least some portion of centralized cloud capabilities. Each service may be stand-alone or operate as a distributed cluster. The edge device 100 may further include a hypervisor 106 configured to implement one or more virtual machines (e.g., virtual machines 108A, 108B, 108C, to 108N, collectively referred to as "virtual machine(s) 108" or "VMs 108").

In some examples, the edge device 100 includes storage 110 (e.g., object and/or block storage for storing local data). The edge device 100 includes operating system (OS) 112. In some embodiments, the OS 112 may be optimized for executing on an edge device and/or specific to execution on an edge device. OS 112 may be configured to manage the hardware of edge device 100 and supports a data plane of the services running on the edge device 100. The OS 112 may be configured to support a specific deployment type (e.g., a single edge device deployment, or a specific edge device cluster configuration). The OS 112 may be configured to secure the edge device by disallowing direct access by customers.

In some embodiments, the edge device 100 may include hardware such as any suitable number of central processing units (CPUs) and/or storage drives. For example, the edge device 100 depicted in FIG. 1 may have one, two, or more CPUs, with various numbers of cores per processing unit, and it may include any number of storage drives (e.g., 6.4 terabyte (TB) drives, or the like). As a non-limiting example, the edge device 100 may include block and/or object storage of any suitable size. The edge device 100 may include any suitable number of central processing units (CPUs), graphics processing units (GPUs), random access memory (RAM) of any suitable size, one or more ports (e.g., QSFP28, RJ45, dual ports, etc.), tamper-evident seals, or any suitable combination of the above components.

In some examples, the basic system functionality/services can be accessed via RESTful APIs have a custom load of software based on Linux. The virtual machine(s) 108 may individually be a Kernel-based Virtual Machines (KVM) and/or a hardware-based Virtual Machine (QEMU). Although storage 110 is represented as a separate component from the container(s) 104 and VM(s) 108, it can run as a container (e.g., container 104A) or in a VM (e.g., VM 108A). In some examples, it may be favorable to implement the storage 110 (e.g., object storage, block storage, etc.) as a container.

Figure 2:
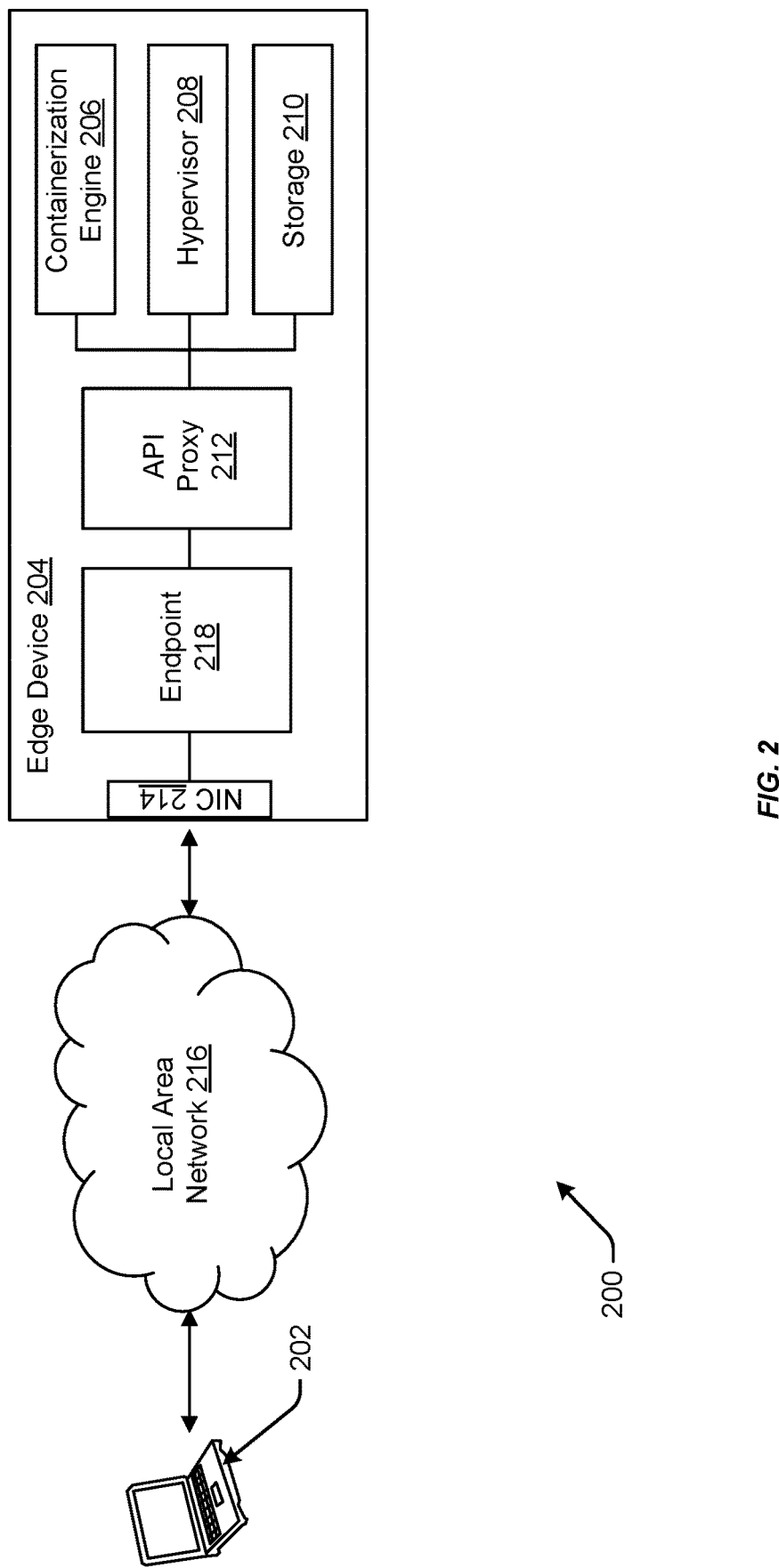
FIG. 2 is a block diagram of an example architecture for connecting a user computing device to a cloud infrastructure edge computing device, according to at least one embodiment.

FIG. 2 depicts an example architecture 200 for connecting the edge device described herein (e.g., edge device 100 from FIG. 1) to a computing device 202 (e.g., a user computing device). The computing device 202 can be any type of computing device including, but not limited to, a laptop computer, a desktop computer, or the like. The edge device 204 (an example of the edge device 100 of FIG. 1) may include containerization engine 206 (an example of the containerization engine 102 of FIG. 1), hypervisor 208 (an example of the hypervisor 106 of 1), and storage 210 (an example of the storage 110 of 1).

Additionally, as mentioned briefly above, the edge device 100 may include an API proxy 212 for managing the RESTful API calls received from the computing device 202. The API calls may enter the edge device 204 via network interface card (NIC) 214 that is internal to the edge device 204. The network interface card 214 may be used to connect the edge device 204 to the computing device 202 via a local area network (e.g., the LAN 216). The API calls received by the NIC 214 may be transmitted to an exposed endpoint that may implement a Web server (e.g., endpoint 218). The web server can transmit the requests to the API Proxy 212, which can route the requests to the appropriate service (e.g., containerization engine 206, hypervisor 208, and/or storage 210). The exposed endpoint/web server may also be configured to implement the lightweight console that is for use by the customer (e.g., the user interface displayed on the computing device 202).

The lightweight console can run within a web browser (e.g., Mozilla Firefox, or the like) on a laptop computer, desktop computer, or other network-accessible device (e.g., connected to the local area network (LAN 216)) that is network-connected to the edge device 204 (e.g., via a router, cable, etc.). The edge device 204 can expose the endpoint 218 for the console connection, and the web server can transmit data to the web browser of the computing device 202 over the LAN 216.

Figure 3:
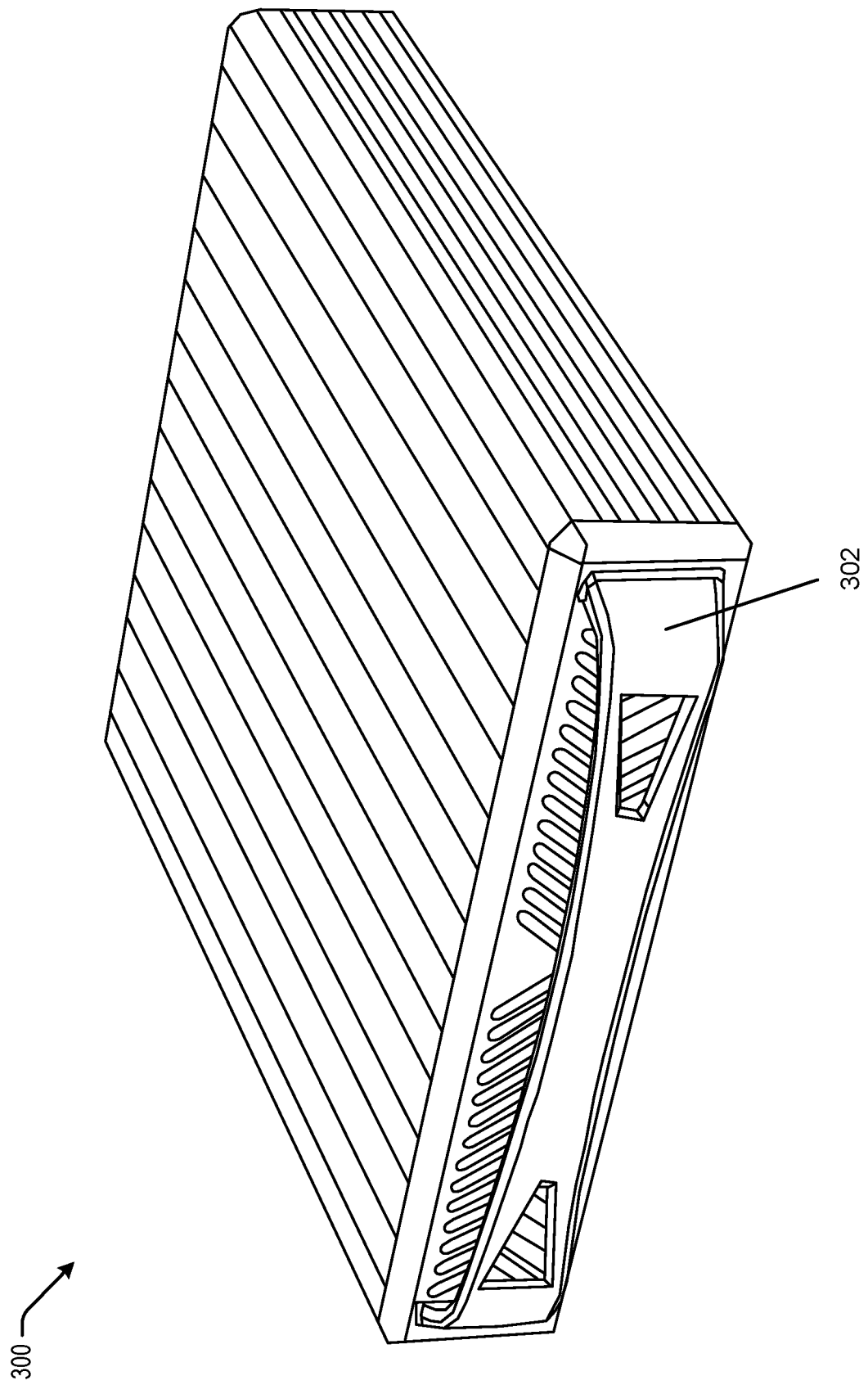
FIG. 3 is a block diagram of an example enclosure for a cloud infrastructure edge computing device, according to at least one embodiment.

FIG. 3 illustrates an example physical enclosure 300 of the edge device described herein (e.g., edge device 100 from FIG. 1). Various different form factors, shapes, colors, etc., can be employed to build a box (e.g., ruggedized) that can house the edge computing device. The physical enclosure can include handle 302, as shown, and may include tamper evident elements, so that if anyone breaks the enclosure open, it will be evident. In this way, the service provider that provides the edge computing device can ensure that the device is not modified. In some examples, the physical enclosure may not be possible to open. However, in some cases, it might be possible, but it would require extreme measures.

Figure 4:
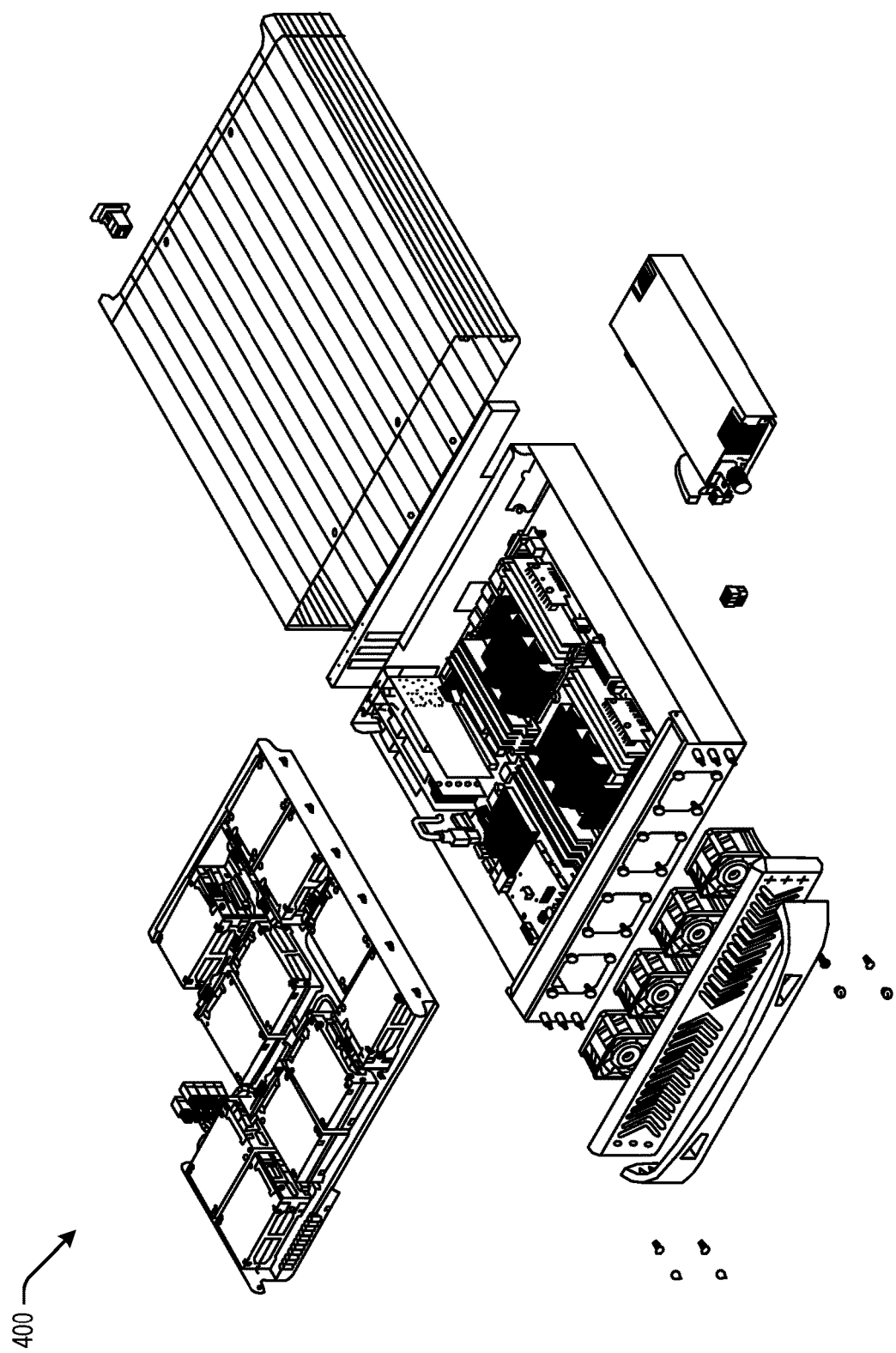
FIG. 4 illustrates an exploded view of the cloud infrastructure edge computing device described herein, in accordance with at least one embodiment.

FIG. 4 illustrates an exploded view of the cloud infrastructure edge computing device described herein (e.g., edge device 400, an example of the edge device 100 of FIG. 1), in accordance with at least one embodiment. The various components described with respect to FIGS. 1 and 2 can be communicatively attached to one or more motherboards and/or interface cards within the edge device 400. The illustrated configuration of components is but just one implementation. The specific locations of components shown is not intended to be limiting, and as noted, any configuration that is capable of implementing the functionality described herein is acceptable. Once the components are installed, the entire box can be closed, sealed, and locked with tamper-evident components.

The edge device 400 is a single enclosure. The enclosure may be designed to house any suitable number of serially attached SCSI (SAS) solid-state drives (SSDs) and all other components (e.g., CPU, memory, GPU, etc.) within the enclosure. The system may include one or more (e.g., 12 Gb) SAS connections to each drive in a fully contained sheet metal enclosure designed to fit within a standard 19" rack resting on an L bracket/shelf, on a table top or upright next to a desk with the use of a floor stand.

The system may include a tamper evident enclosure, front security plugs covering screws holding a front bezel in place with rear security interlock features. In some embodiments, the system may include a dual socket motherboard and any suitable amount of DRAM. In some embodiments, the system may include any suitable number (e.g., 2, 3, etc.) SATA SSDs, storage controllers, embedded network connections, one or more ports (e.g., dual ports, serial ports, etc.), one or more fans as part of a cooling system, or any suitable combination of the above.

As a non-limiting example, the edge device 400 may be made up of an external extruded aluminum case secured in the front with a vented bezel and rear panel only exposing I/O connections required for data transfer and management. Mounting can be designed to mount the any suitable motherboard, fans, and power supply.

Figure 5:
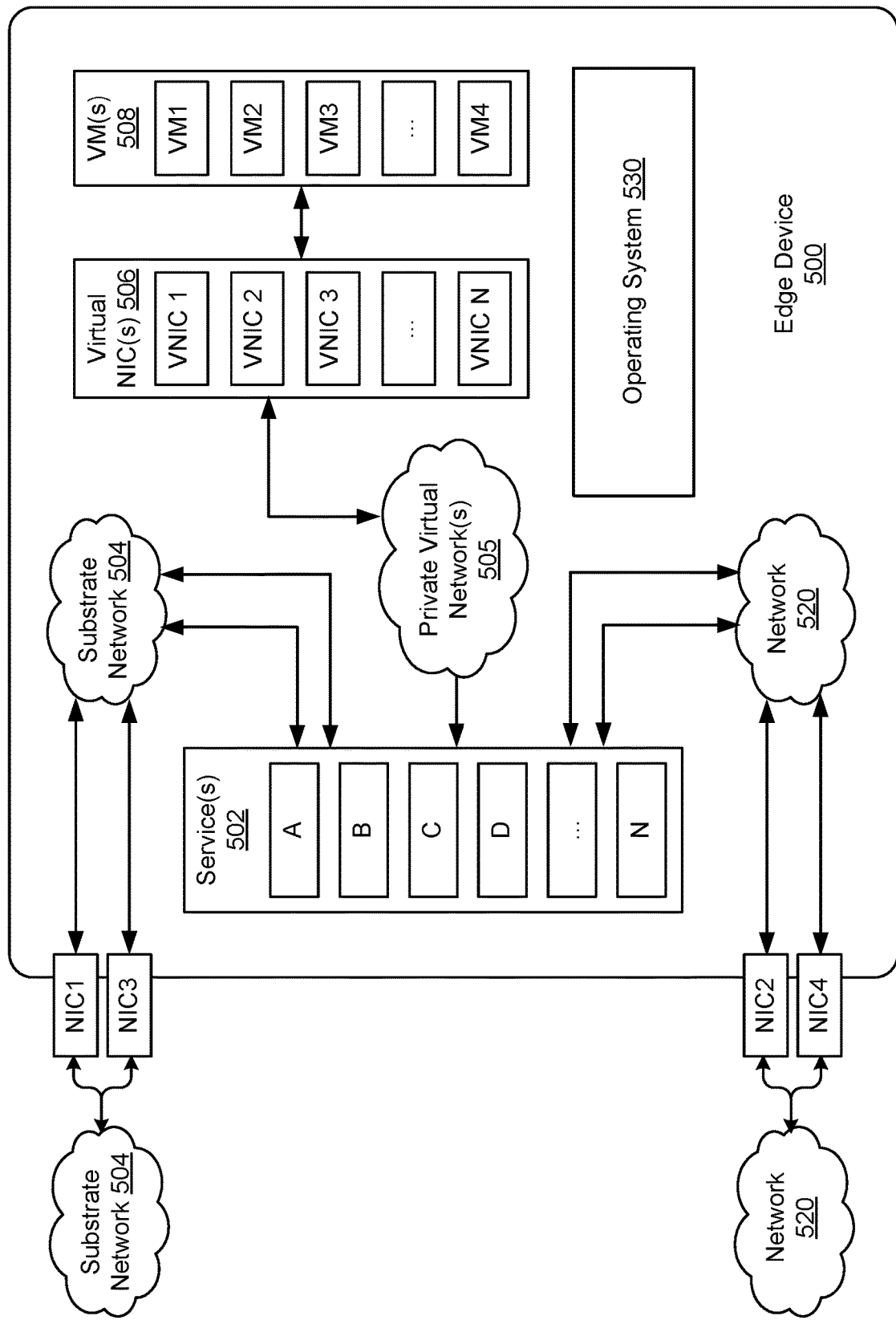
FIG. 5 is a block diagram of an example computer architecture of a cloud infrastructure edge computing device, according to at least one embodiment.

FIG. 5 is a block diagram of an example computer architecture 500 of a cloud infrastructure edge computing device (e.g., edge device 500, an example of the edge devices 100 and 204, of FIGS. 1 and 2, respectively), according to at least one embodiment. The edge device 500 can be thought of as a cloud-integrated service that extends some or all of conventional cloud capabilities to locations outside of cloud data centers. This can be achieved via portable ruggedized server nodes that provide cloud-like functionality in locations with no WAN connectivity. This allows customers to shift select cloud workloads to remote locations and enable intensive data processing operations close to the data ingestion points at the edge of their cloud infrastructure.

The edge device 500 may include any suitable number of services (e.g., service(s) 502). Each service may run as a container (e.g., a Docker container) locally on the edge device 500. The service(s) 502 may be communicatively connected via a substrate network 504 such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 500 is shipped to the user). The edge device's system software (including service(s) 502) may execute in the secure environments protected by boot security software (e.g., Trenchboot Secure Launch). Users may be restricted from accessing the secure environment and/or the substrate network 504. To minimize the amount of resources used by these services the service code may be compiled and saved to disk to decrease RAM space as well as decrease the CPU load on the edge device 500.

Some example services included in service(s) 502 may include a UI console service, an identity control plane (CP) service, an identity data plane (DP) service, a compute application programming interface (API) service, a compute worker thread service, a virtual network (VN) API service, a block storage API service, a function-as-a-service service, an events service, an object storage management service (e.g., implementing a storage platform such as Ceph Storage (a product of Red Hat, Inc.)), a compute DP service (e.g., an example of hypervisor 208 of FIG. 2), a VN DP service, a block storage management service, a function-as-a-service API service, a function-as-a-service load balancing (LB) service, a function-as-a-service process thread service, a distributed data store management service (e.g., etcd3), a dynamic host configuration protocol service, a domain name system service, a network time protocol (NTP) service, to name a few. Some example functionality provided by these services is discussed below.

By way of example, compute DP service may be configured (e.g., preconfigured and provisioned onto the edge device 500) to isolate the VM(s) 508 on the same hypervisor host. The compute DP service can utilize any suitable container engine (e.g., Docker container, MicroContainer, or the like) to isolate the VM(s) 508 on the same hypervisor host from each other. The compute DP service may utilize any suitable hypervisor (e.g., Quick EMUlator (QEMU), Kernel-based Virtual Machine (KVM), etc.) to provide virtual hardware emulation for VM(s) 508. In some embodiments, VNIC(s) 506 are attached to subnets of any suitable number of virtual networks (e.g., private virtual network(s) (PVN(s))) 505 and are assigned private Internet Protocol (IP) addresses. One VM may have multiple VNICs from different VCNs and different subnets. The maximum number of VNICs can be limited by predefined thresholds (e.g., configuration data referred to as "VM shape" that defines VNICs per VM count, VNIC shape, etc.). In some embodiments, the predefined thresholds are applied to each of the VM(s) 508. The subnets utilized by the VNIC(s) 506 may be isolated by VLANs. In some embodiments, some or all of the VNIC(s) 506 may be assigned public and/or private IP addresses. A public IP address is an address in the network(s) 520, while a private IP address refers to an IP address of the PVN(s) 505.

In some embodiments, the edge device 500 implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) 508. In some embodiments, DHCP service assigns private IP addresses to each of the VNIC(s) 506, each of the VM(s) 508 having one or more VNICS. DNS service may provide domain name resolution to VM(s) 508 on the edge device 500. NTP may provide time synchronization to VM(s) 508. In some embodiments, a public IP service executing as part of service(s) 502 may enable a VM to access a public API without assigning the VM a public IP and without configuring a service gateway.

In some embodiments, at least one of the VM(s) 508 may implement block (or object) storage. In some embodiments, the hypervisor associated with a virtual machine may include a library that enables the hypervisor to use a distributed data storage platform (e.g., Ceph). The library may utilize a protocol associated with that storage platform (e.g., RADOS Block Device (RBD) to facilitate storage of block-based data. The distributed data storage platform may be implemented over multiple virtual machines. In some embodiments, the distributed data storage platform supports making snapshots and copying block volumes. VM images and VM block volumes can be Ceph block devices. In some embodiments, the VM(s) implementing the distributed data storage platform will use system reserved resources (e.g., 8 CPU cores, some of the total number of CPUs available on the edge device 500). For example in order to provision a boot volume, a block device image may be copied to a boot volume of the block device. The distributed data storage platform may use block devices include multiple nodes for redundancy. If some node fails then the block device can continue to operate. In some embodiments, the distributed data storage platform (e.g., Ceph), automatically recovers the block device data in case of a few node failures. Block storage may be utilized to store images for any suitable deployable resource. By way of example, an image may be utilized for launching VMs. In some embodiments, the image may correspond to a particular VM shape (e.g., a compute heavy VM, a GPU optimized VM, a storage VM, and the like).

Compute API service may support the following operations: 1) VM launch and terminate, 2) VM stop, start, reboot, 3) List VMs and/or get information on a specific VM, 4) obtain VM console history API, 5) obtain a VM snapshot, 6) attach/detach block volumes, and the like. In some embodiments, Compute API service can be used to call other services (e.g., compute DP service, identity DP service for authentication and authorization, etc.).

Some of the functionality of other services will be discussed in connection with FIG. 7. In general, although each service may not be discussed in detail herein, the general functionality provided by the service(s) 502 may include the functionality of cloud services provided by a remote cloud service provider. In some embodiments, the edge device 500 may be associated with a predefined region and/or realm such that some of the service(s) 502 may operate as if they were operating in a cloud computing environment, despite the fact they are operating on one or more local device(s) (one or more edge devices) as a single instance or as part of a distributed service that may have no or intermittent public network access to a cloud computing environment associated with the customer.

In some embodiments, the edge device 300 may provide any suitable number of virtual networks (e.g., private virtual network(s) 505) using compute, memory, and networking resources (e.g., virtual network interface card(s) (VNIC(s) 506)). A virtual network is a logical network that runs on top of a physical substrate network. Using the service(s) 502, one or more customer resources or workloads, such as virtual machines (e.g., virtual machine(s) (VM(s)) 508, executing a compute instance) can be deployed on these private virtual networks. Any suitable combination of VM(s) 508 can execute functionality (e.g., a compute instance, storage, etc.) which is individually accessible through a virtual NIC (e.g., one of the virtual NIC(s) 506). Each VM that is part of a PVN is associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 505 can take on many forms, including peer-to-peer networks, IP networks, and others. In some embodiments, substrate network traffic of the service(s) 502 may be encrypted and/or isolated (e.g., by virtue of different PVNs or subnets) from network traffic of one or more the VM(s) 508 executing on the edge device 500.

The edge device 500 thus provides infrastructure and a set of complementary services that enable customers to build and run a wide range of applications (e.g., compute instances), services, and/or storage in a highly available, physically local, and virtual hosted environment. The customer does not manage or control the underlying physical resources provided by the edge device 500 but has control over expanding or reducing virtual machines (e.g., compute instances, virtual NICs, block or object storage, etc.), deploying applications to those virtual machines, and the like. All workloads on the edge device 500 may be split into different CPU sets (e.g., VM and non-VM). One set (e.g., non-VM such as workloads performed by the service(s) 502) may utilize a subset of CPU cores (e.g., 8) of the edge device 500, while the other set (e.g., VM workloads performed by the VM(s) 508) may utilize a different subset of CPU cores.

The edge device 500 may be communicatively connected to a user device (e.g., the computing device 202 of FIG. 2) via one or more network interfaces (e.g., NIC2 and/or NIC 4) and network 520 to interact and/or manage the VM(s) 508. In certain embodiments, a lightweight console can be provided at the user device via a web-based user interface that can be used to access and manage the edge device 500. In some implementations, the console is a web-based application (e.g., one of the service(s) 502) provided by the edge device 500.

FIG. 5 depicts a single edge device. However, it should be appreciated that more than one edge device may be utilized as a distributed computing cluster.

Figure 6:
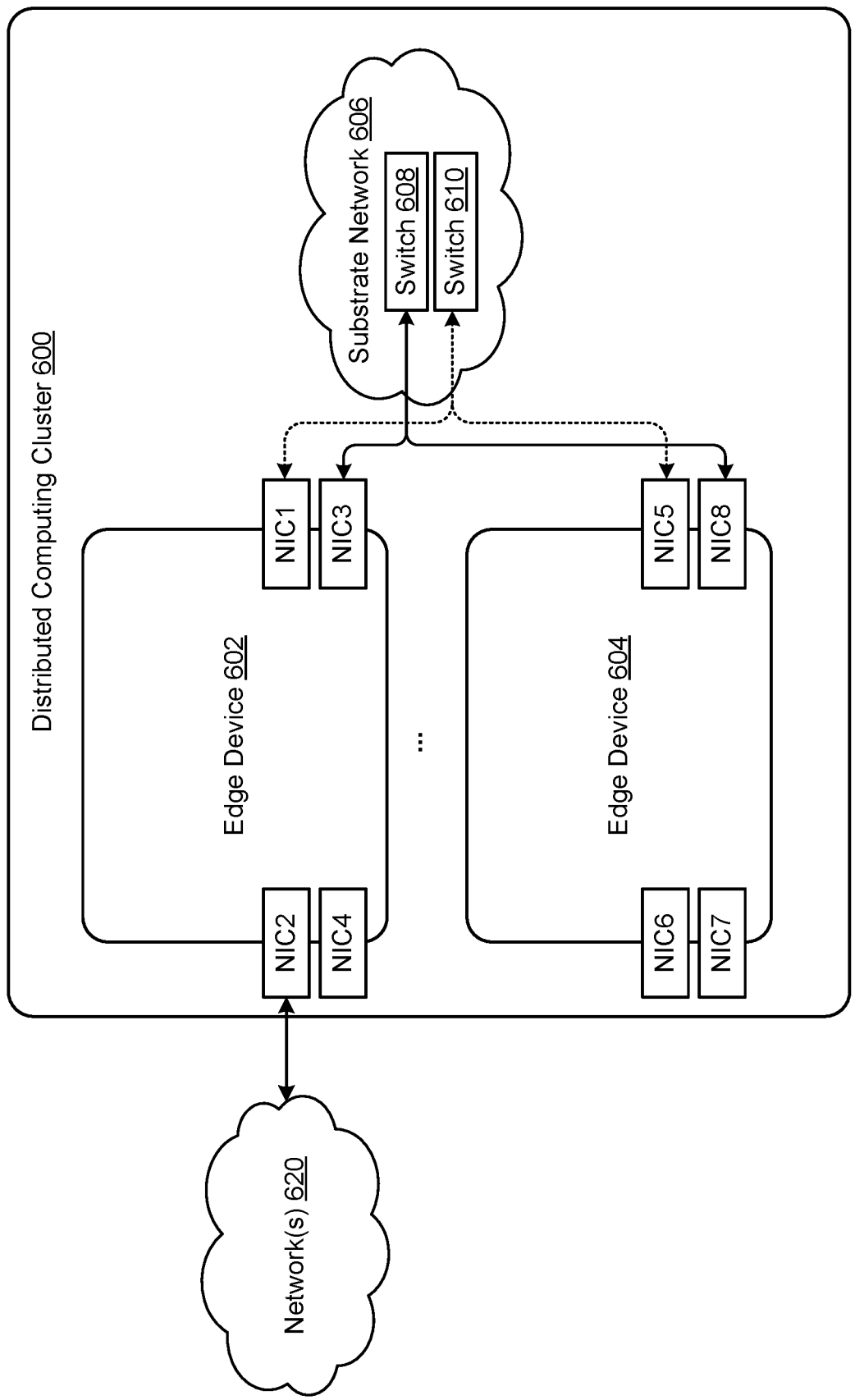
FIG. 6 is a block diagram depicting a distributed computing cluster that includes one or more edge computing devices, according to at least one embodiment.

FIG. 6 is a block diagram depicting a distributed computing cluster 400 that includes one or more edge computing devices (e.g., edge device 602 and 604, each an example of the edge device 500 of FIG. 5), according to at least one embodiment.

Each edge device of the distributed computing cluster 600 may be connected via substrate network 606 (an example of the substrate network 504 of FIG. 5. In some embodiments, the edge devices of the distributed computing cluster 600 (sometimes referred to as "edge computing nodes" or "edge nodes") may be connected by the substrate network 606 using one or more switches (e.g., switch 608 and/or 610). In some embodiments, NIC1 and NIC5 may include a particular connector (e.g., RJ45 connector) while NIC3 and NIC8 may include the same or a different connector (e.g., a QSFP28 100 GbE connector). In some embodiments, only one edge device of the distributed computing cluster 600 is connected to a customer network such as network(s) 620 (an example of the network(s) 520 of FIG. 5). Thus, not only may traffic between services of an edge device be encrypted and isolated from other traffic of a given edge device, but traffic between distributed services operating across multiple edge devices may also be encrypted and isolated from other traffic of the computing cluster. In some embodiments, each edge device is preconfigured as a particular node in the distributed computing cluster 400. In other embodiments, the user can configured the number and topology of the edge devices of the distributed computing cluster 600.

Figure 7:
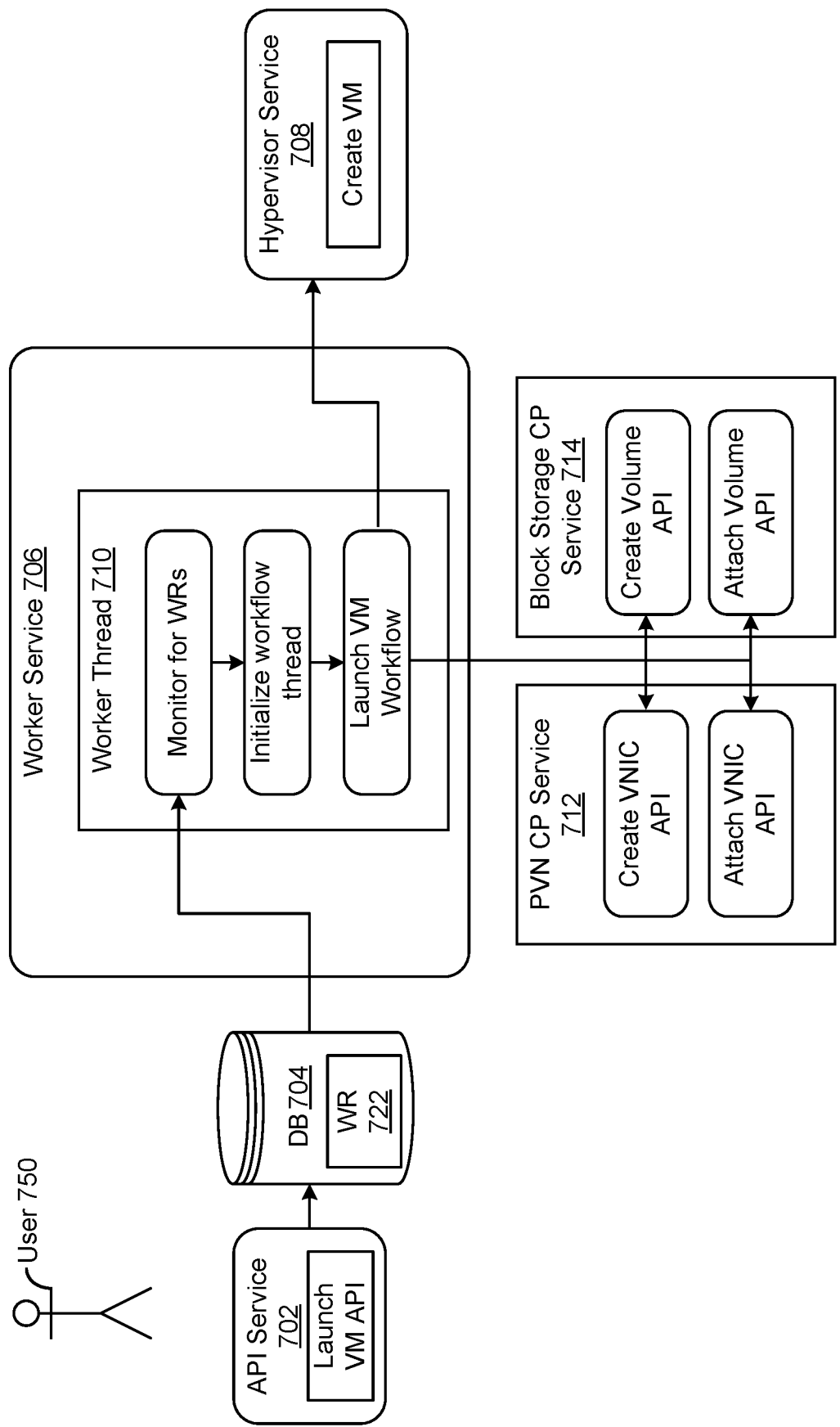
FIG. 7 is a block diagram depicting a control plane and flow for executing a workflow by one or more components of a cloud infrastructure edge computing device, according to at least one embodiment.

FIG. 7 is a block diagram depicting a flow 700 for executing a workflow by one or more components of a cloud infrastructure edge computing device, according to at least one embodiment. Components that execute the flow 700 may include API service 702, database 704, service 706, hypervisor service 708, PVN CP service, Block storage CP service 714, although more or fewer services may be included. In some embodiments, each of the services of FIG. 7 are an example of a service of the service(s) 502 of FIG. 5. In some embodiments, at least some of the functionality discussed in connection with the services of FIG. 7 may be combined in any suitable combination and provided as a single service or instances of the same service. By way of example, in some embodiments, the functionality of services 702-708 may be provided by a single service (e.g., compute CP service discussed above in connection with FIG. 5). In some embodiments, the functionality provided by the services 702-708 may be provided by a single edge device (e.g., edge device 500 of FIG. 5) or by two or more edge devices (e.g., by edge device 602 and edge device 604 of FIG. 6).

In some embodiments, the API service 702 may be configured to accept work requests that include intended state data that describes an intended state of a set of data plane resources (e.g., VM(s) 508 of FIG. 5). As a non-limiting example, user 720 may utilize a user device (e.g., the user device 202 of FIG. 2) to access a user interface with which he can make various selections indicating a desire to launch a VM. The user input may be received by the API service 702 (an example of the compute CP service of FIG. 5) which may generate a work request (e.g., WR 722) and utilize a predefined Launch VM API to store the work request in a distributed database (e.g., DB 704). In some embodiments, the DB 704 may be a computing cluster which is configured to use etcd3 as an immediately consistent, highly-available, transactional, distributed database. Generally, a work request indicates a desire and information needed to create and/or modify data plane resources such as VM(s) 508. In some embodiments, the work request includes state information indicating a desired state for the data plane resource. In some embodiments, the DB 704 may be accessible to all services operating on any edge device (and by services operating on any suitable edge device of an edge device cluster such as distributed computing cluster 600).

Service 706 (e.g., also an example of the compute CP service of FIG. 5) may be configured to execute one or more worker processes (e.g., computing thread 710). Some of these worker processes may be configured by the service 706 at any suitable time to execute a continuous and/or ongoing predefined workflow. By way of example, the service 706 may configure one or more worker threads (e.g., including computing thread 710) to monitor the DB 704 for new work requests (e.g., WR 722). The computing thread 710 may be configured to determine if a work request WR 722 is already being attended to. In some embodiments, this entails checking a predefined storage bucket within DB 704 for a unique identifier associated with WR 722. If the unique ID included within WR 722 does not appear in the bucket (or the WR is otherwise indicated as having not been picked up for processing), the computing thread 710 (e.g., a nanny thread) may initialize a workflow thread (e.g., another instance of a computing thread 710) which may then be configured by the computing thread 710 to execute a workflow corresponding to launching a VM corresponding to the WR 722.

The initialized workflow thread may be communicatively coupled (e.g., via the substrate network 504 of FIG. 5) to a workflow service (not depicted). The workflow service may be configured to identify, from one or more predefined workflows, one that corresponds to launching a VM, and therefore, to the work request 722. These predefined workflows identify one or more steps/operations to be taken, and a sequence to those steps, in order to achieve a predefined goal (e.g., launching a virtual machine, stopping/starting a virtual machine, terminating a virtual machine, creating a block volume, removing a block volume, etc.). The workflow thread may launch the VM workflow and oversee its execution by various other entities. In some embodiments, the workflow thread may pass any suitable portion of the intended state data of the DP resource to any suitable combination of services.

As a non-limiting example, as part of the workflow for launching a virtual machine (e.g., a VM to be hosted by hypervisor service 708), one or more APIs can be called for creating and attaching the VNIC. Similarly, a number of APIs may be provided for creating and/or attaching a block storage volume API. In some embodiments, the workflow thread may perform any suitable call to one or more APIs to invoke the functionality of PVN CP Service 712, which in turn may be configured to create and attach a VNIC. The workflow thread may then call block storage CP service 714 which may then execute any suitable operations to create and attach a block storage volume. The worker thread overseeing the workflow may ensure a designated order (e.g., create the VNIC first before creating the block volume). This worker thread may be configured to catch any errors and/or exceptions from one or more services it has invoked. If no exceptions/errors are encountered, the worker thread overseeing the workflow can provide any suitable data to the hypervisor service 708 (via the substrate network), which in turn, execute functionality for creating the VM requested. The hypervisor service 708 may provide actual state data for the newly launched VM. In some embodiments, the worker thread overseeing the workflow can store the actual state data in the DB 704 for later reference (e.g., when a monitor may determine whether the actual state data matches the requested state data indicating no changes needed or when the actual state data fails to match the requested state data, indicating a change of the data plane resources is needed).

In some embodiments, the workflow thread may be communicatively coupled to a cluster manager (not depicted). Cluster manager may be configured to manage any suitable number of computing clusters. In some embodiments, the cluster manager may be configured to manage any suitable type of computing cluster (e.g., a Kubernetes cluster, a set of computing nodes used to execute containerized applications, etc.). The workflow thread may be configured to execute any suitable operations to cause the cluster manager to execute any suitable orchestration operation on the DP resource(s) (e.g., a VM) in accordance with the instructions identified to bring the DP resource(s) in line with the intended state data. In some embodiments, a monitoring entity (e.g., the workflow thread, a thread launched by the workflow thread) may be communicatively coupled to DP resource(s) 116 and configured to monitor the health of DP resource(s). In some embodiments, the monitoring entity may be configured to store any suitable health data in the DB 704.

The specific operations and services discussed in connection with FIG. 7 is illustrative in nature and is not intended to limit the scope of this disclosure. The particular operations performed and services utilized may vary depending on the particular workflow associated with the requested operations.

Intra-Node Security

As discussed briefly above, the edge devices may host one or more services (e.g., service(s) 502 of FIG. 5) that may communicate over an intra-node network (e.g., substrate network 504 of FIG. 5). In particular, services hosted on one edge device may communicate with services hosted on one or more other edge devices within a distributed computing cluster to provide the functionality of distributed services. More generally, communication and other data transmissions (e.g., messages, networking packets, frames, etc.) between all of the edge devices in the distributed computing cluster may occur over a dedicated intra-node network. Physical networking between the edge devices may be provided by an intra-node switch that can be separate from a client switch that provides public network access for the distributed computing cluster.

To ensure security of the intra-node communications, the edge devices may implement a security protocol to encrypt data transmitted over the intra-node network. The security protocol can include MACsec, IPsec, or other similar security protocol. Because the edge device cluster may be physically located outside a trusted secure location, the techniques described below can provide resilience against physical security vulnerabilities while providing functionality equivalent to a cloud-based service model.

Figure 8:
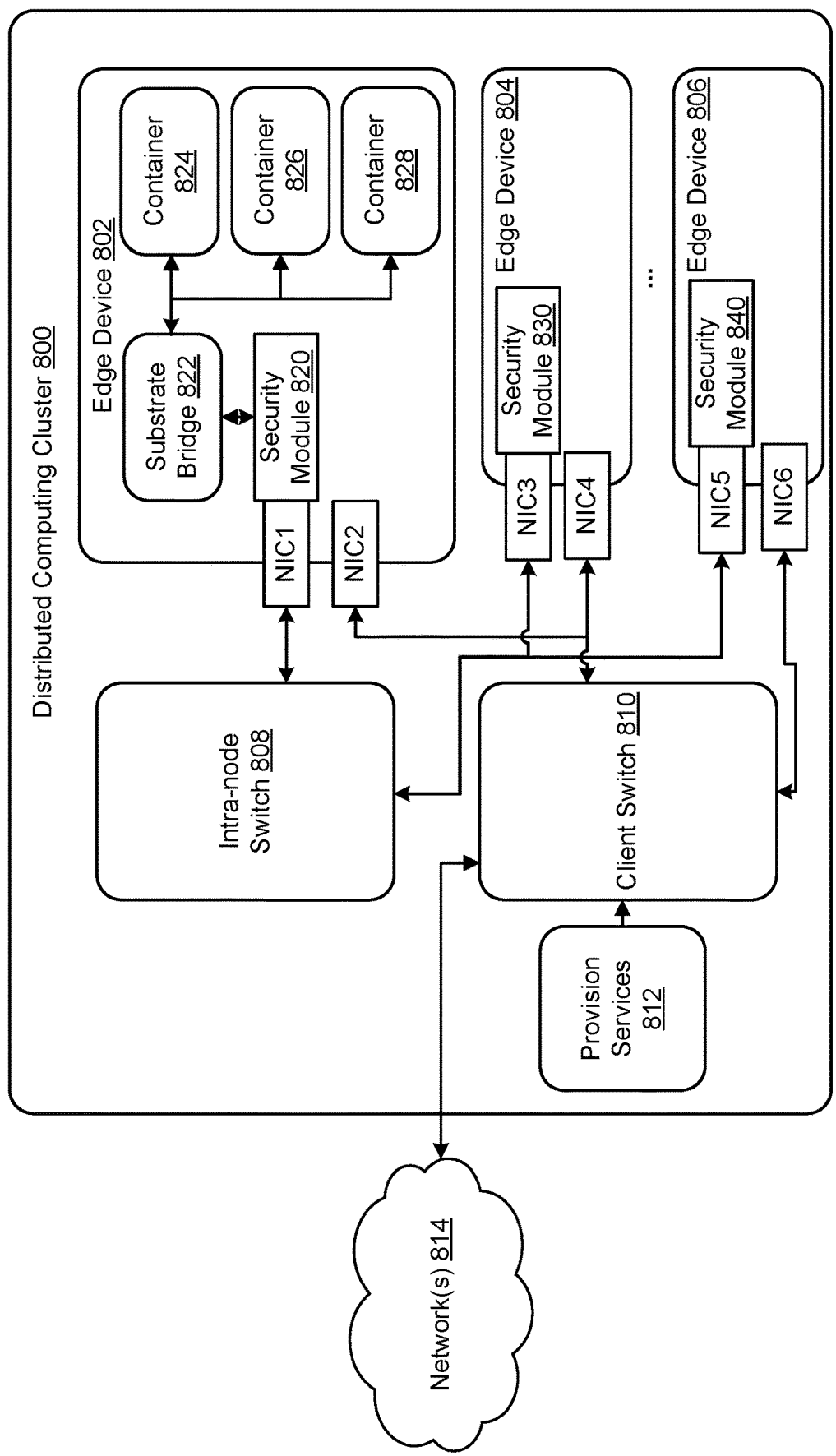
FIG. 8 is a block diagram depicting a computing cluster that includes encrypted communications channels between edge computing devices, according to at least one embodiment.

FIG. 8 is a block diagram depicting a distributed computing cluster 800 including a plurality of edge devices 802-806 communicatively connected to one another via an intra-node switch 808. Distributed computing cluster 800 may be similar to distributed computing cluster 600 of FIG. 6, while edge devices 802-806 may be examples of edge device 500 of FIG. 5, according to at least one embodiment. As depicted, each edge device may be connected to the intra-node switch 808 to form an intra-node network (e.g., an example of substrate network 504) between the edge devices. Each edge device may also be connected to a client switch 810, which in turn connects to one or more network(s) 814 (e.g., client network, public internet, etc.). The interfaces (e.g., NIC1-NIC6) with the intra-node switch 808 and the client switch 810 can include the same or different connectors (e.g., RJ45, QSFP28, etc.) depending on the configuration of the distributed computing cluster 800 and/or the network(s) 814.

The intra-node switch 808 and the client switch 810 can provide network switching functionality in accordance with one or more networking standards (e.g., Ethernet). In particular, the intra-node switch 808 can provide packet switching for all packets transmitted between edge devices in the cluster. The topology of the distributed computing cluster 800 with respect to the client network (e.g., network(s) 814) may vary. For example, in some embodiments, only one edge device may connect to client switch 810. Data received from the client switch 810 at the edge device connected to the client switch 810 may be propagated to the other edge devices via the intra-node network over the intra-node switch 808. In other embodiments, each edge device is connected to both the client switch 810 and the intra-node switch 808.

In some embodiments, the intra-node switch 808 and the client switch 810 may be multilayer switches and provide additional networking functionality (e.g., routing) for traffic within the distributed computing cluster 800 and between the distributed computing cluster 800 and network(s) 814. The additional network functionality can include provision services 812 that can include DHCP, trivial file transfer protocol (TFTP), hypertext transfer protocol (HTTP), and registry. For example, provision services 812 can include a DHCP service (e.g., a DHCP server) for assigning IP addresses (e.g., public IP addresses within the client network) to devices attached to the client switch 810, including edge devices 802-806.

As described in detail above, particularly with reference to FIG. 5, each edge device may provide a wide variety of infrastructure components (e.g., services, virtual machines (VMs), containers, etc.) to support cloud computing within the distributed computing cluster 800. In some embodiments, the edge computing devices 802-806 may implement a distributed control plane configured to perform operations related to managing the infrastructure services and components. For example, a control plane (CP) of a given edge device may send instructions (e.g., to a hypervisor) to provision one or more VMs configured to execute tasks. A distributed CP may be distributed over two or more edge devices (e.g., any suitable combination including at least two of edge devices 802-806) in the distributed computing cluster 800, such that the CP services hosted on individual edge devices provide the distributed CP. In this way, the distributed CP may access hardware and software resources of any edge device to perform CP operations. For example, a CP service of the distributed CP (e.g., a CP service executing on edge device 802) may perform operations to instruct a hypervisor of edge device 804 to provision a VM on edge device 804.

Distributed CP operations may be implemented by one or more communications between the edge devices. Other processes and services executing on the edge devices can also communicate with additional processes and services executing on other edge devices. For example, containers 824, 826, 828 may host processes executing on edge device 802 that can communicate with other processes executing on edge devices 804, 806. Processes in containers 824, 826, 828 may send data via substrate bridge 822 to security module 820. Substrate bridge 822 may be a virtual networking device implemented in the network stack of edge device 802 and can be associated with other networking components including virtual Ethernet endpoints to link the substrate bridge 822 to the containers 824, 826, 828.

Data transmission between the edge devices (e.g., distributed CP traffic, application traffic, etc.) may be carried out on the intra-node network (e.g., substrate network 504) via the intra-node switch 808. To secure the intra-node traffic, each edge device may provide a security module (e.g., security modules 820, 830, 840, or the like) configured to encrypt transmitted data according to an encryption protocol or other security protocol. In some embodiments, the security module 820 may be implemented in software. For example, the security module 820 may be a MACsec device (e.g., a Linux MACsec device) implemented in the network stack of edge device 802.

Each security module may be configured as part of an initialization of the corresponding edge device. For example, a provider of edge devices for a distributed computing cluster (e.g., distributed computing cluster 800) may provision software and software configurations for each edge device in the cluster. The configuration(s) can include specifying identifiers (e.g., media access control (MAC) addresses) for each edge device and/or related component (e.g., a NIC). The configuration can also include specifications for initializing the security module when the corresponding edge device is first provisioned (e.g., at initial boot). For example, edge device 802 may be configured to establish a MACsec device corresponding to the interface NIC1 such that the MACsec device can encrypt and transmit data (e.g., frames) to security module 830, security module 840, and/or any suitable security modules of distributed computing cluster 800. The correspondence of MACsec devices on one edge device may be implemented by associating the MACsec device on one edge device (e.g., edge device 802) with the MAC address corresponding to another edge device (e.g., edge device 804 or its NIC3).

In some embodiments, the configuration of nodes (e.g., edge devices) in the distributed computing cluster 800 may be static, such that the number of edge devices is fixed at the time of provisioning the distributed computing cluster 800 at the client site. For a static configuration, identifiers like MAC addresses may also be static, since edge devices will not be added to the cluster (or intentionally removed from the cluster). In some embodiments, failed edge devices may be replaced with another edge device configured with identical parameters as the failed device. In this way, a provider of a distributed computing cluster 800 may create a configuration (e.g., a manifest) for the cluster that specifies the identities (e.g., MAC addresses) of all components in the cluster and their relationship (e.g., network addresses, network communication channels). This configuration may be used to initialize the cluster during provisioning.

In the embodiments in which MACsec is the security protocol for the intra-node network communications (e.g., substrate network communications), the edge devices may form one LAN over the intra-node switch 808. The initial configuration of each edge device may also include configuration of the intra-node network to correspond to one LAN (e.g., by setting appropriate IP addresses to configure the LAN, etc.). In this manner, edge device 802-806 may communicate over the intra-node network (one LAN) with all frames encrypted, with no other intra-node network available to allow for unencrypted traffic between edge devices in the distributed computing cluster 800.

MACsec enables encryption of all data (e.g., data frames) between edge devices, including any suitable combination of distributed CP traffic and other device traffic, DHCP traffic, address resolution protocol (ARP) traffic, other network infrastructure traffic, or the like. MACsec encrypted frames may be decrypted at a corresponding MACsec device (e.g., the recipient MACsec device) on another edge device.

In some embodiments, a security module (e.g., the security module 820, or the like) may implement IPsec as the security protocol or encryption protocol. Similar to MACsec, IPsec can provide encryption to network packets transmitted between edge devices on the intra-node network. IPsec may not secure network infrastructure traffic (e.g., DHCP, ARP, neighbor discovery), but can allow for routing of encrypted packets between different LANs. An IPsec protocol may establish a mesh network between all the edge devices in the distributed computing cluster 800.

The encryption protocol or security protocol implemented by security module 820 (and/or security modules 830, 840) in the distributed computing cluster 800 may use a key (e.g., a symmetric key) to perform cryptographic operations for encrypting data (e.g., packets and/or data frames). For example, MACsec may use an AES-128 key, while IPsec may use an AES-256 key. Each edge device may be provisioned with any suitable key to implement the encryption protocol or security protocol. For example, each edge device may have be provisioned with the same AES-256 key for establishing the IPsec mesh. Additionally, each edge device may include configuration information for network routing (e.g., classless inter-domain routing (CIDR) values) to establish the IPsec mesh. As discussed in more detail below with respect to FIG. 9, the key may reside in a secured (e.g., encrypted) storage (e.g., an enclave, or the like) on the edge device and may be retrieved by the edge device for use by its security module. In some embodiments, the key or keys used to provide the security protocol or encryption protocol may be rotated on a predetermined schedule. Rotating the encryption keys can include securely providing new keys to the edge devices.

Network traffic delivered via the client switch 810 may also be encrypted using a second encryption protocol or second security protocol. In some embodiments, the second encryption protocol or second security protocol may be different from that used via the intra-node switch 808. For example, client request traffic may be encrypted using transport layer security (TLS). Depending on the network topology of the edge devices with respect to the client switch 810 (e.g., only one edge device connected to client switch 810), the client request traffic may be received at a first edge device and decrypted according to the second encryption protocol to retrieve request data. This request data may include a request for the distributed computing cluster 800 to perform specific operations in accordance with the request data. For example, edge device 802 may receive a request to provision additional VMs within the distributed computing cluster 800. The edge device 802 may then execute operations to provision the VMs. The VMs may be provisioned on edge device 802 or another edge device (e.g., edge device 806) in the distributed computing cluster 800. Distributed CP traffic to carry out operations at another edge device (e.g., instructions to provision VMs at the other edge device) may be encrypted and transmitted to the other edge device via the intra-node switch 808 on the intra-node network.

Figure 9:
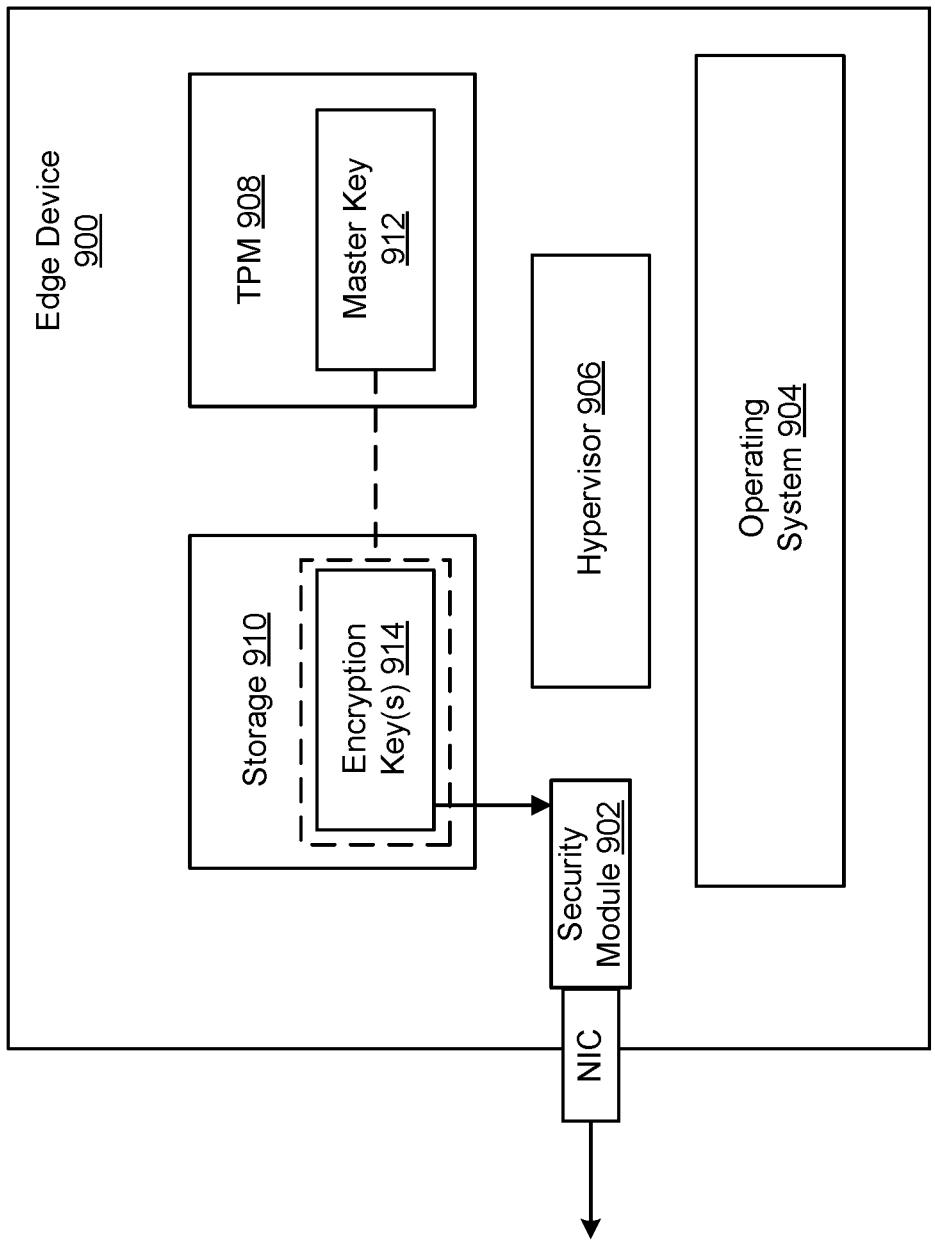
FIG. 9 is a block diagram of an example architecture of a cloud infrastructure edge computing device configured to securely manage encryption keys, according to at least one embodiment.

FIG. 9 is a block diagram of an example architecture of a cloud infrastructure edge computing device 900 (an example of the edge computing devices 802-806) configured to securely manage encryption key(s) 914, according to at least one embodiment. Edge device 900 may be a representative example of any of the edge devices in a distributed computing cluster (e.g., distributed computing cluster 800 of FIG. 8). For example, each edge device in a distributed computing cluster may be provisioned similarly to edge device 900, with its own set of encryption keys. Some of the encryption keys stored on one edge device may be identical to encryption keys stored on each of the other edge devices in a distributed computing cluster.

As part of the initial provisioning of the edge device 900 for use within a distributed computing cluster, encryption key(s) 914 may be stored in a storage 910 of the edge device. The encryption key(s) 914 can include any suitable number and type of encryption keys, passwords, certificates, and the like for implementing one or more security protocols and/or encryption protocols on the edge device 900 or within an associated distributed computing cluster. For example, encryption key(s) 914 can include boot disk passwords, default user passwords, a node certificate authority (CA) certificate, root certificates, an AES-128 key (e.g., a MACsec key), an AES-256 key (e.g., an IPsec key), a customer unlock key (e.g., provided by a customer receiving the edge device 900 and incorporated into the edge device during provisioning), and/or other credentials.

The encryption key(s) 914 may be stored in a secured portion of storage 910, such that the encryption key(s) 914 are themselves encrypted (indicated by the dashed line) while stored on the edge device 900. The encryption of the encryption key(s) 914 may be associated with a master key 912, such that master key 912 may be used to decrypt the encryption key(s) 914 for use by the edge device 900. In some embodiments, the master key 912 may be stored at a trusted platform module (TPM) 908 of the edge device 900. The master key 912 may be the private key of a certificate (e.g., a node certificate). The TPM 908 may be a distinct chip, a hardware security module, an integrated circuit platform, or other hardware, firmware, and/or software for providing secure initialization of the edge device and security management of stored secrets, including encryption key(s) 914.

Operations for encrypting and decrypting data and managing the encryption key(s) 914 may be performed by the hypervisor 906, which may be similar to other hypervisors described herein (e.g., hypervisor 106 of FIG. 1, hypervisor service 708 of FIG. 7, etc.). The hypervisor 906 may perform operations in conjunction with the TPM 908 to decrypt the encryption key(s) 914 or other encrypted data stored on the edge device 900 (e.g., within an encrypted disk partition, not depicted).

In some embodiments, the TPM 908 may be configured to both secure and seal the encryption key(s) 914. Securing the encryption keys refers to using the master key 912 to decrypt (and re-encrypt) the encryption key(s) 914, using an encryption protocol tied to the master key 912 (e.g., public key encryption for which the master key 912 is the private key of a public key pair). Sealing the encryption keys refers to verifying the state of software present on the edge device 900 prior to decrypting the encryption key(s) 914 for use. For example, the TPM 908 may store hashed values of a trusted and/or known combination of software to be deployed at the edge device 900 and compare the hashed values to hashes of the software actually present at the edge device 900. If the hashes match, then the TPM may perform operations to decrypt the encryption key(s) 914.

In addition to decrypting encryption key(s) 914, the TPM 908 may perform operations related to securely booting the edge device 900 via boot measurements and remote attestation. As with sealing the encryption key(s) 914, during boot the TPM 908 may generate hashes of edge device 900 software (e.g., the BIOS, the bootloader, the hypervisor, the OS kernel, the OS 904) and store the hashes. By way of example, to generate a hash (e.g., a value) the edge device 900 may provide software data (e.g., software binaries, software name and/or version, etc.) to a predefined hashing algorithm. During operation of the edge device 900, a request for remote attestation can be received. In response the TPM 908 can create, secure, and digitally sign a copy of the stored hashes of the software executing on the edge device 900 and transmit the signed copy to the requester for remote attestation of the state of the edge device 900.

Once decrypted, the encryption key(s) 914 may be used by security module 902 (an example of security module 820 of FIG. 8). For example, in some embodiments, security module 902 may use an AES-128 key to implement MACsec at the edge device 900 to encrypt data (e.g., data frames) between edge device 900 and other edge devices within a distributed computing cluster (e.g., the distributed computing cluster 800 of FIG. 8). In other embodiments, the security module 902 may use an AES-256 key to implement IPsec to encrypt network packets sent to other edge devices. As part of the security protocol or encryption protocol, the security module 902 may generate additional encryption keys (e.g., public/private key pairs) that may be shared with other edge devices to provide the cryptographic functionality of the security protocol or encryption protocol. These additional encryption keys may be generated by using the encryption key(s) 914 obtained from storage 910.

In some embodiments, an edge device in a distributed computing cluster may be configured to act as a local certificate authority (CA) for the distributed computing cluster. The TPM 908 may store certificates and certificate private keys to provide certificate signing for processes executing within the distributed computing cluster. For example, the TPM 908 may store a root certificate associated with a cloud-based CA associated with the distributed computing cluster. Certificates may be used to implement the functionality of TLS for traffic arriving via the client network (e.g., client request traffic through the client switch 810). Certificates may also be used to verify edge devices when establishing an IPsec mesh. According to certain embodiments, the TPM 908 may store the master key 912 that allows decryption and/or access to the certificates and certificate private keys used for certificate signing as described above. The certificates and certificate private keys may then be stored as part of encryption key(s) 914 (e.g., in an encrypted key store) instead of within the TPM 908 to preserve storage space within TPM 908.

The edge device 900 may be provisioned with certificate public and private keys usable to sign certificates as the local CA for the distributed computing cluster. To establish trust, the edge device 900 can have the provisioned public and private key pairs signed by a cluster-specific CA (e.g., a CA provided by the provider of the distributed computing cluster) so that processes executing within the distributed computing cluster can verify trust in the same manner as if the processes were executed in a cloud environment. The local CA may then function even when the distributed computing cluster is disconnected from higher level CAs.

Figure 10:
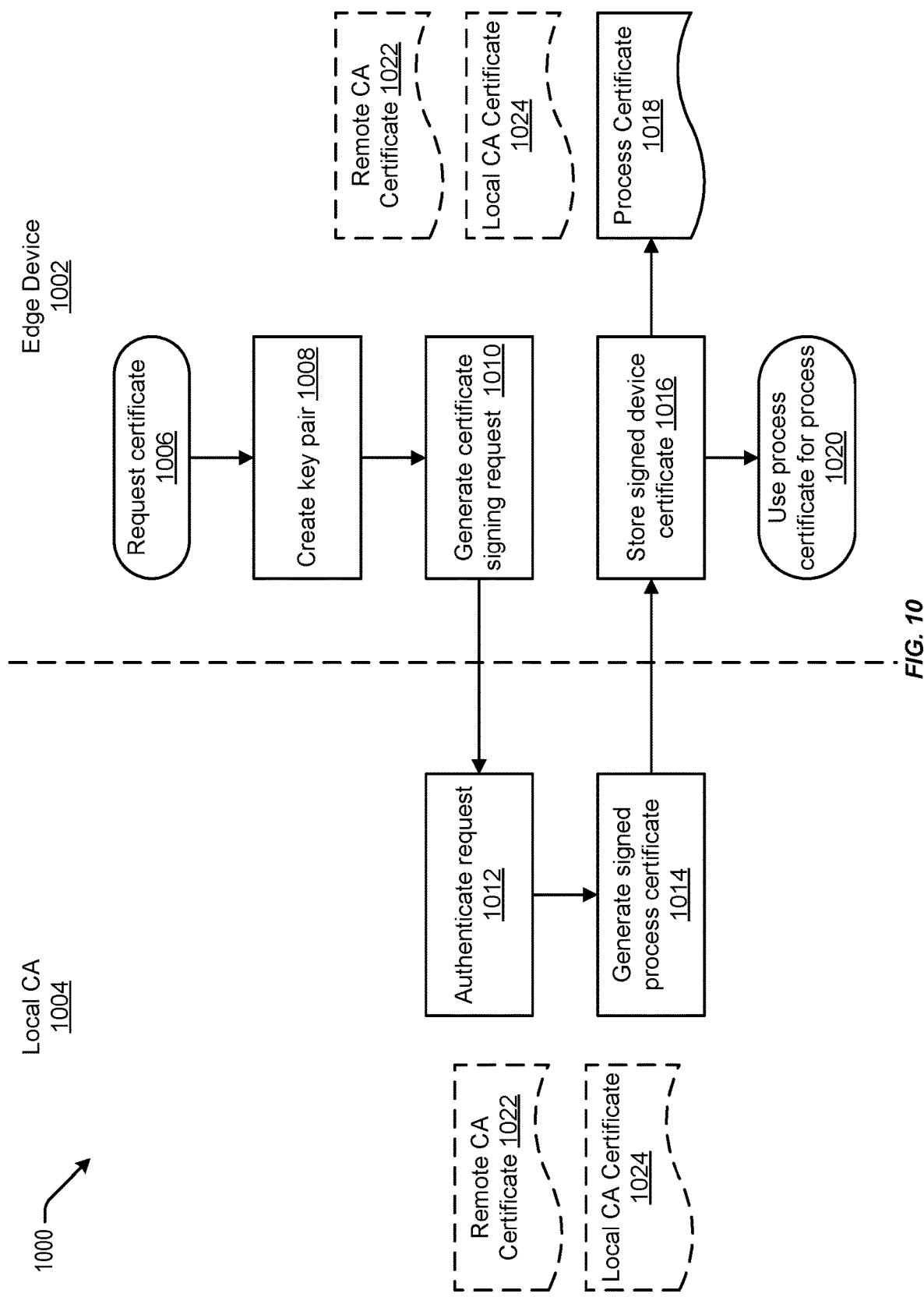
FIG. 10 illustrates an example method for generating certificates by a local certificate authority hosted within a distributed computing cluster, according to at least one embodiment.

FIG. 10 illustrates an example method 1000 for generating certificates by a local certificate authority (CA) 1004 hosted within a distributed computing cluster (e.g., the distributed computing cluster 800 of FIG. 8). The distributed computing cluster can include any suitable number of edge devices, including edge device 1002, which may each be an example of the edge devices and distributed computing clusters described above with respect to FIGS. 1-9. Each edge device of the distributed computing cluster may host a local CA 1004. The certificates may be used by edge computing devices to implement secure communication channels with devices and/or services external to the distributed computing cluster (e.g., a client device, a cloud-based service, etc.). The method 1000 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the method 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Prior to execution of method 1000, each edge device of the distributed computing cluster may be configured with a copy of the remote certificate authority (CA) certificate 1022. In some embodiments, each remote CA certificate 1022 may include a public key of the remote CA (e.g., a remote service of a cloud infrastructure). In some embodiments, as part of the initial provisioning of the edge devices in a distributed computing cluster (e.g., by a vendor of the distributed computing cluster), an edge device (e.g., the edge device 1002, the local CA 1004, each edge device in the cluster, etc.) may generate its own public/private key pair. The public/private key pair may be generated by an agent (e.g., a provisioning process) executing on the edge device and configured to securely communicate with the remote CA. The agent may provide the public key of that pair to the remote CA, which can sign the public key to provide a corresponding local CA certificate 1024 to the edge device. In some embodiments, more than one edge device (e.g., each edge device of the cluster) may generate a key pair and submit its public key to the remote service for signing. In these examples, each edge device of the cluster may then have a unique local CA certificate (e.g., local CA certificate 1024). The remote CA certificate 1022 can be used to verify the signature of the local CA certificate 1024 to establish a chain of trust from the remote CA to the local CA 1004 in the distributed computing cluster. At the completion of the initial provisioning of the edge devices, the agent may be removed from the edge device.

The method 1000 may begin at block 1006, when a process executing at edge device 1002 requests a certificate. For example, a data synchronization process may request a certificate that it can utilize to establish a secure communication channel (e.g., mutual transport layer security (mTLS)) with a cloud-service. As another example, a process executing on the distributed computing cluster may request a process certificate with which it may sign calls to other processes within the distributed computing cluster.

At block 1008, the edge device 1002 can create a key pair. The key pair can include a private key and a public key. The private key may be stored in a secure key storage of edge device 1002 (e.g., storage 910 of FIG. 9). The key pair may be generated by an agent executing on the edge device 1002 that is configured to manage certificate requests and generated keys. This agent may be different from the agent that executes during device provisioning and used for obtaining remote CA certificate 1022 and local CA certificate 1024.

At block 1010, the edge device 1002 may generate a certificate signing request (CSR). The generated CSR can include identifying information of edge device 1002 (e.g., a distinguished name, a fully qualified domain name, etc.), as well as a configuration of the edge device 1002. The CSR may also include identifying information of the process requesting the certificate (e.g., a process name, process ID, or the like). In some embodiments, the CSR includes the generated public key and is digitally signed using the generated private key.

At block 1012, the CSR is sent to the local CA 1004 for authentication. As discussed briefly above, the local CA 1004 may be hosted at each edge device (e.g., edge device 1002) within the distributed computing cluster. The local CA 1004 may authenticate the CSR by verifying the identifying information and/or the configuration information of the edge device 1002. The local CA 1004 may also validate the public key provided as part of the CSR by using the public key to decrypt the digital signature of the CSR.

After the local CA 1004 authenticates the CSR at block 1012 (e.g., by validating the digital signature and therefore authenticating the edge device 1002 as a trusted device), it may generate a signed process certificate 1018, at block 1014. The signed process certificate 1018 may be digitally signed using the private key associated with local CA certificate 1024. The signed process certificate 1018 may be stored at edge device 1002, at block 1016. The local CA certificate 1024 and remote CA certificate 1022 form a chain of trust from the remote CA to the local CA 1004 on the edge device 1002, so that the process certificate 1018 signed by the local CA may be trusted by other edge devices in the distributed computing cluster.

At block 1020, the process may use the process certificate 1018. For example, edge device 1002 may provide the process certificate 1018 to another device when establishing a secure communication channel. The other device may be an external device or an external service to establish an mTLS channel. The edge device 1002 can send the process certificate 1018 along with local CA certificate 1024 to the external device, such that the external device can verify the edge device 1002 and/or the distributed computing cluster that includes edge device 1002. In some embodiments, the other device may be another edge device in the distributed computing cluster to establish an IPsec channel. For example, the process certificate 1018 and/or the local CA certificate 1024 may be used to exchange IPsec secrets (e.g., IPsec keys) between the edge device 1002 and a new edge device added to the distributed computing cluster (e.g., added as an expansion of the distributed computing cluster or as a replacement for a failed edge device in the cluster). The process certificate 1018 may be used to authenticate the edge device 1002, for example by verifying the signature of process certificate 1018 using local CA certificate 1024 and remote CA certificate 1022.

Figure 11:
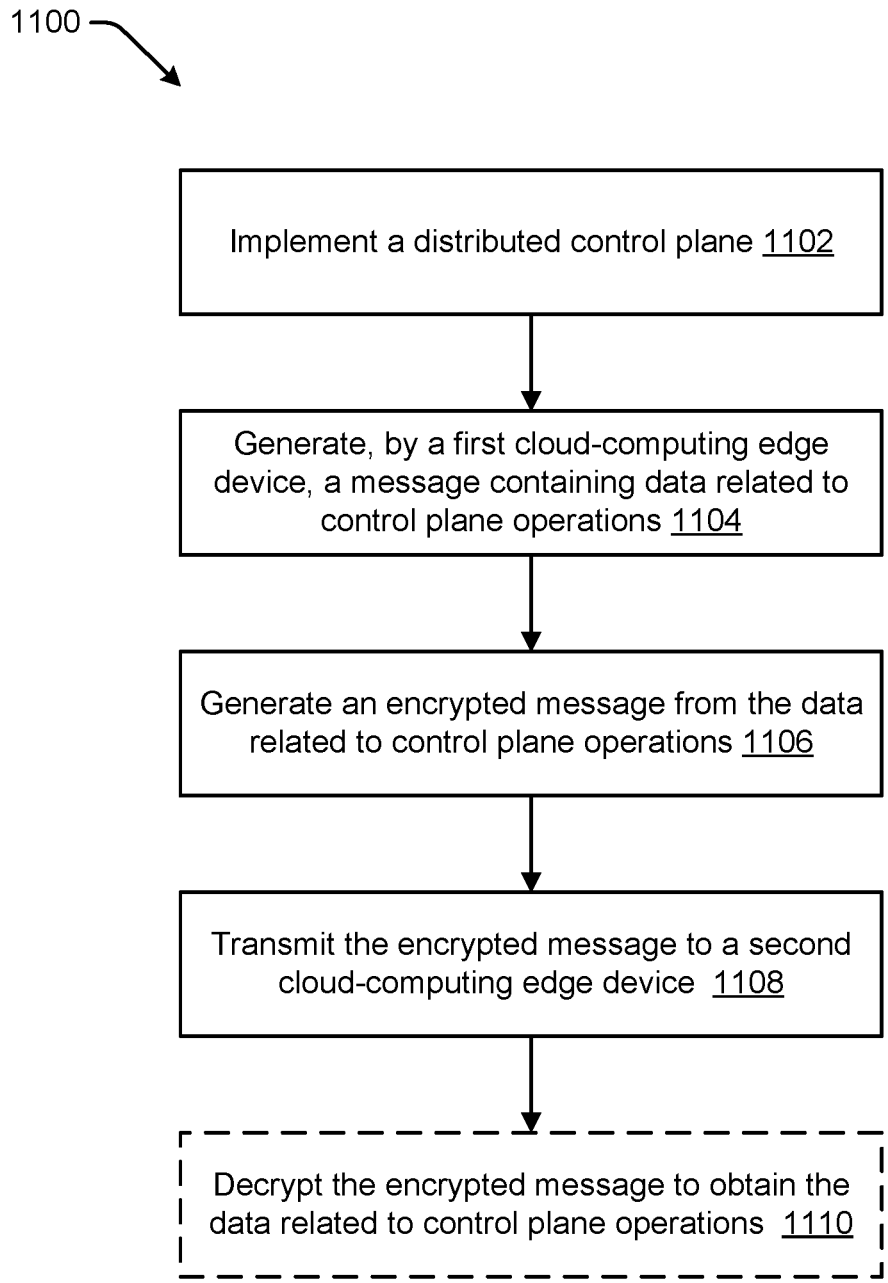
FIG. 11 illustrates an example method for encrypting intra-node communications between edge computing devices, according to at least one embodiment.

FIG. 11 illustrates an example method 1100 for encrypting intra-node communications between edge computing devices (e.g., communications provided over substrate network 504 of FIG. 5), according to at least one embodiment. In particular, the intra-node communications may be control plane communications between control plane (CP) processes executing on different edge devices within a distributed computing cluster (e.g., the distribute computing cluster 800 of FIG. 8). The distributed computing cluster can include any suitable number of edge devices, and may be examples of the edge devices and distributed computing clusters described above with respect to FIGS. 1-9.

The method 1100 may begin at block 1102 by implementing a distributed CP (e.g., a distributed CP implemented by the edge devices 802-806 of FIG. 8). The distributed CP can include CP processes executing on a plurality of cloud-computing edge devices in a distributed computing cluster (e.g., distributed computing cluster 800 of FIG. 8). The CP processes may be configured to communicate with one another over an intra-node network (e.g., the substrate network 504 of FIG. 5), such that CP operations can be performed at any of the plurality of cloud-computing edge devices.

In some embodiments, the intra-node network (e.g., substrate network 504) is composed of a LAN implemented by communicatively connecting the plurality of edge devices via an intra-node switch (e.g., intra-node switch 808). In some embodiments, the LAN may use Ethernet as its communication protocol.

In some embodiments, each of the plurality of edge devices may be individually configured to encrypt data (e.g., using at least one of encryption key(s) 914 of FIG. 9) transmitted via the intra-node switch (e.g., the intra-node switch 808 of FIG. 8). For example, an edge device may be configured to implement MACsec for data transmitted on the substrate network. The configuration of the edge device to encrypt intra-node traffic may be specified in a configuration file, manifest, or other similar data file provided with the edge device during its initial provisioning by the vendor of the distributed computing cluster. The configuration may specify identifiers (e.g., MAC addresses, IP addresses, etc.) for other edge devices within the distributed computing cluster, such each edge device can establish the encrypted communication channel over the intra-node switch with one or more of the other edge devices in the distributed computing cluster.

At block 1104, a first cloud-computing edge device (e.g., edge device 802) can generate a message containing data related to control plane operations (e.g., data requesting that a new virtual machine be provisioned at edge device 804). CP operations can include instructions for creating, provisioning, de-provisioning, managing, modifying, or otherwise interacting with the infrastructure of the distributed computing cluster. As a non-limiting example, a CP operation can include provisioning a VM within the distributed computing cluster. The VM may be hosted on the first cloud-computing edge device (e.g., edge device 802), a second cloud-computing edge device (e.g., edge device 804), or any other cloud-computing edge device in the distributed computing cluster. In general, a distributed CP may perform CP operations on any of the edge devices within the cluster, such that CP processes executing on one edge device may instruct CP processes on another edge device to carry out the CP operations.

At block 1106, the first cloud-computing edge device (e.g., edge device 802) can generate an encrypted message from the data related to control plane operations. The encrypted message may be generated by a security module of the first cloud-computing edge device (e.g., security module 820 of FIG. 8). The encryption may be based on any suitable encryption protocol. By way of example, the encryption protocol may be a MACsec protocol. In some embodiments, the encrypted message may be encrypted (e.g., by the security module 820 with an encryption key) at the packet level or the data frame level as a preliminary part of transmitting the packet or the data frame. In some embodiments, each packet or frame is encrypted by the security module (e.g., sequentially as the part of transmitting the encrypted message). The encryption process may use the generated message containing the data related to control plane operations.

At block 1108, the first cloud-computing edge device can transmit the encrypted message to a second cloud-computing edge device (e.g., the edge device 806) in the computing cluster. Transmitting the encrypted message can include transmitting any suitable number of encrypted data packets or encrypted data frames from the first cloud-computing edge device (e.g., the edge device 802) to the second cloud-computing edge device (e.g., the edge device 806). The encrypted message can be transmitted via the intra-node switch (e.g., the intra-node switch 808) over an intra-node network (e.g., the substrate network 504) composed of the plurality of cloud-computing edge devices in the distributed computing cluster.

In some embodiments, the second cloud-computing edge device (e.g., the edge device 806) can decrypt the received encrypted message to obtain the data related to control plane operations, at block 1110. Decrypting the encrypted message can include decrypting the received data frames or data packets to retrieve the original data. In some embodiments, the second cloud-computing edge device can decrypt the received data frames or data packets using an identical key to the key used to encrypt the packets (e.g., symmetric encryption keys, one of the encryption key(s) 914 of FIG. 9). Said another way, both the first cloud-computing edge device and the second cloud-computing edge device can store identical copies of an encryption key used to encrypt and decrypt data. The identical encryption keys may be created and stored at the edge devices during provisioning of the edge devices for the distributed computing cluster.

The data for control plane operations can include operations to be executed at the second cloud-computing edge device (e.g., provisioning a VM at the second cloud-computing edge device). In this way, distributed CP operations may be performed among any suitable number of the plurality of cloud-computing edge devices.

In some embodiments, the first cloud-computing edge device may store a data encryption key (e.g., encryption key(s) 914). The data encryption key may itself be encrypted using a third encryption protocol while stored at the first cloud-computing edge device. The third encryption protocol may be associated with a master key (e.g., master key 912) stored at a trusted platform module (e.g., TPM 908) of the first cloud-computing edge device. As described above with respect to FIG. 9, the master key may be the private key of a public/private key pair used as part of the third encryption protocol. The data encryption key may be stored in a key storage of the first cloud-computing edge device and encrypted using the public key (e.g., by the initial provisioner of the plurality of cloud-computing edge devices), and then retrieved and decrypted by the TPM and hypervisor of the first cloud-computing edge device when the data encryption key is needed to generate the encrypted message.

Figure 12:
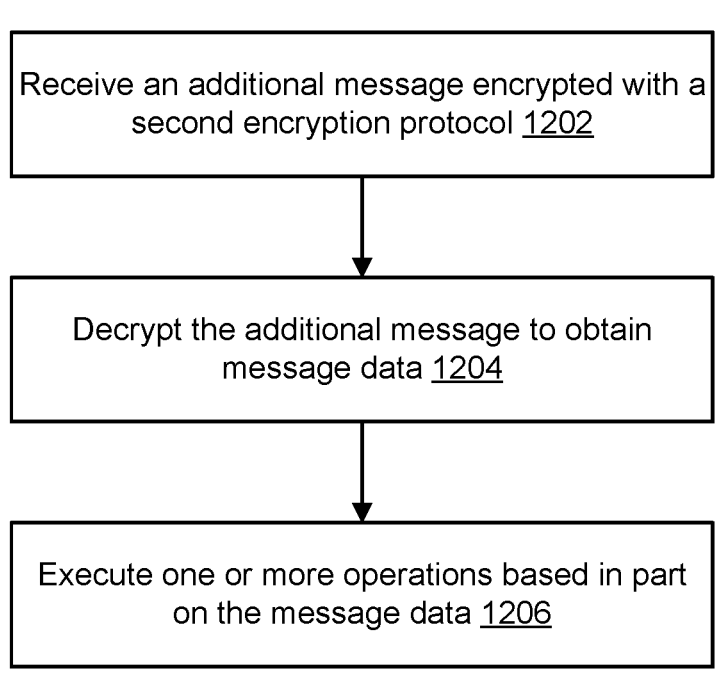
FIG. 12 illustrates an example method for receiving encrypted data from a client device, according to at least one embodiment.

FIG. 12 illustrates an example method 1200 for receiving encrypted data from a client device, according to at least one embodiment. The operations of FIG. 12 may be performed in conjunction with one or more of the operations performed by a distributed computing cluster (e.g., the distributed computing cluster 800) containing a plurality of cloud-computing edge devices (e.g., edge devices 802-806 of FIG. 8) described above with respect to FIG. 11. The plurality of cloud-computing edge devices may be communicatively connected to a client switch. The client switch may provide access to one or more client networks (e.g., an internal client network, the Internet, etc.) that is separate from the substrate network enabled via the intra-node switch. In some embodiments, all of the cloud-computing edge devices connect to the client switch (e.g., via a physical Ethernet connection). In other embodiments, only one cloud-computing edge device connects physically with the client switch, with the other cloud-computing edge devices communicatively connected to the switch via a communication channel provided over the substrate network to the edge device physically connected to the switch. Other configurations to communicatively connect the edge devices to the client switch are possible.

At block 1202, the first cloud-computing edge device may receive an additional message from the client switch. The additional message may be encrypted using a second encryption protocol. The additional message may originate from a client device that is connected to the distributed computing cluster via the client switch. For example, the client device may send a request to execute a workflow or other task at the computing cluster. The request may target an API provided by the computing cluster. Based on the request, the computing cluster may execute one or more operations to perform the workflow or other task. The request may be encrypted using TLS or other suitable encryption protocol. In some embodiments, the second encryption protocol may be TLS, IPsec, MACsec, or similar protocol.

At block 1204, the first cloud-computing edge device can decrypt the additional message to obtain message data. The message data may include a request payload or other data specifying an action or operation for the computing cluster to take in response. Continuing the example above, the additional message may include a request to execute a workflow on the computing cluster. To execute the workflow, one or more VMs and/or one or more containers may be provisioned in the computing cluster to perform tasks associated with the additional message.

At block 1206, the first cloud-computing edge device can execute one or more operations based on the message data. The operations can include CP operations, such that the first cloud-computing edge device may generate and send encrypted data in accordance with the method 1100 described above.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   implementing, by a computing cluster comprising a plurality of cloud-computing edge devices, a distributed control plane in which each of the plurality of cloud-computing edge devices is configured to provision and manage cloud infrastructure resources of the computing cluster independent from communicating with a device that is external to the computing cluster, the plurality of cloud-computing edge devices being communicatively connected to one another via an intra-node switch of the computing cluster, each of the plurality of cloud-computing edge devices being individually configured to encrypt or decrypt control plane data transmitted via the intra-node switch based at least in part on each of the plurality of cloud-computing edge devices being previously provisioned with encryption keys and a root certificate for the computing cluster;
   generating, by a first cloud-computing edge device of the distributed control plane, a message comprising data related to control plane operations corresponding to a first resource of the cloud infrastructure resources of the computing cluster;
   generating, by the first cloud-computing edge device of the distributed control plane and based at least in part on an encryption protocol and a first data encryption key of the encryption keys provisioned on the first cloud-computing edge device, an encrypted message from the message comprising the data related to the control plane operations corresponding to the first resource of the cloud infrastructure resources of the computing cluster;
   authenticating, by the first cloud-computing edge device using the root certificate, a second cloud-computing edge device of the distributed control plane;
   responsive to the authentication, transmitting, by the first cloud-computing edge device to the second cloud-computing edge device of the distributed control plane, the encrypted message via the intra-node switch;
   decrypting, by the second cloud-computing edge device using a second data encryption key of the encryption keys provisioned on the second cloud-computing edge device, the encrypted message to obtain the data related to the control plane operations corresponding to the first resource of the cloud infrastructure resources of the computing cluster; and
   based at least in part on obtaining the data related to the control plane operations that correspond to the first resource of the cloud infrastructure resources of the computing cluster, executing, by the second cloud-computing edge device, an operation for provisioning or managing the first resource of the cloud infrastructure resources of the computing cluster.

2. The computer-implemented method of claim 1, wherein the plurality of cloud-computing edge devices are communicatively connected to a client switch, and further comprising:
   receiving, from the client switch at the first cloud-computing edge device, an additional message initiated from a client device, the additional message being encrypted with a second encryption protocol;
   decrypting, by the first cloud-computing edge device and using the second encryption protocol, the additional message to obtain message data; and
   executing, by the first cloud-computing edge device, one or more operations based at least in part on the message data obtained.

3. The computer-implemented method of claim 1, wherein the first data encryption key is stored in a key storage at the first cloud-computing edge device, the first data encryption key encrypted with a third encryption protocol comprising a master key, the master key stored at a trusted platform module of the first cloud-computing edge device.

4. The computer-implemented method of claim 3, further comprising:
   retrieving, by the first cloud-computing edge device, the first data encryption key from the key storage; and
   decrypting, by the trusted platform module, the first data encryption key using the master key.

5. The computer-implemented method of claim 2, wherein the encryption protocol is different from the second encryption protocol.

6. The computer-implemented method of claim 1, wherein the encryption protocol is a media access control security protocol.

7. A computing cluster, comprising:
   an intra-node switch;
   a plurality of cloud-computing edge devices communicatively connected to one another via the intra-node switch, the plurality of cloud-computing edge devices comprising one or more processors and one or more memories storing computer-executable instructions that, when executed with the one or more processors, cause the computing cluster to:
implement a distributed control plane in which each of the plurality of cloud-computing edge devices is configured to provision and manage cloud infrastructure resources of the computing cluster independent from communicating with a device that is external to the computing cluster, each of the plurality of cloud-computing edge devices being individually configured to encrypt or decrypt control plane data transmitted via the intra-node switch based at least in part on each of the plurality of cloud-computing edge devices being previously provisioned with encryption keys and a root certificate for the computing cluster;
generate, by a first cloud-computing edge device of the distributed control plane, a message comprising data related to control plane operations corresponding to a first resource of the cloud infrastructure resources of the computing cluster;
generate, by the first cloud-computing edge device of the distributed control plane and based at least in part on an encryption protocol and a first data encryption key of the encryption keys provisioned on the first cloud-computing edge device, an encrypted message from the message comprising the data related to the control plane operations corresponding to the first resource of the cloud infrastructure resources of the computing cluster;
authenticate, by the first cloud-computing edge device using the root certificate, a second cloud-computing edge device of the distributed control plane;
responsive to the authentication, transmit, by the first cloud-computing edge device to the second cloud-computing edge device of the distributed control plane, the encrypted message via the intra-node switch;
decrypt, by the second cloud-computing edge device using a second data encryption key of the encryption keys provisioned on the second cloud-computing edge device, the encrypted message to obtain the data related to the control plane operations corresponding to the first resource of the cloud infrastructure resources of the computing cluster; and
based at least in part on obtaining the data related to the control plane operations that correspond to the first resource of the cloud infrastructure resources of the computing cluster, execute, by the second cloud-computing edge device, an operation for provisioning or managing the first resource of the cloud infrastructure resources of the computing cluster.

8. The computing cluster of claim 7, wherein the plurality of cloud-computing edge devices are communicatively connected to a client switch, and wherein the one or more memories store further instructions that, when executed by the one or more processors, cause the computing cluster to further:
receive, from the client switch at the first cloud-computing edge device, an additional message initiated from a client device, the additional message being encrypted with a second encryption protocol;
decrypt, by the first cloud-computing edge device and using the second encryption protocol, the additional message to obtain message data; and
execute, by the first cloud-computing edge device, one or more operations based at least in part on the message data obtained.

9. The computing cluster of claim 7, wherein the first data encryption key stored in a key storage at the first cloud-computing edge device, the first data encryption key encrypted with a third encryption protocol comprising a master key, the master key stored at a trusted platform module of the first cloud-computing edge device.

10. The computing cluster of claim 9, wherein the one or more memories store further instructions that, when executed by the one or more processors, cause the computing cluster to further:
retrieve, by the first cloud-computing edge device, the first data encryption key from the key storage; and
decrypt, by the trusted platform module, the first data encryption key using the master key.

11. The computing cluster of claim 8, wherein the encryption protocol is different from the second encryption protocol.

12. The computing cluster of claim 7, wherein the encryption protocol is a media access control security protocol.

13. A non-transitory computer-readable storage medium comprising executable instructions that, when executed by one or more processors of a computing cluster comprising a plurality of cloud-computing edge devices, cause the computing cluster to:
implement a distributed control plane in which each of the plurality of cloud-computing edge devices is configured to provision and manage cloud infrastructure resources of the computing cluster independent from communicating with a device that is external to the computing cluster, the plurality of cloud-computing edge devices being communicatively connected to one another via an intra-node switch of the computing cluster, each of the plurality of cloud-computing edge devices being individually configured to encrypt or decrypt control plane data transmitted via the intra-node switch based at least in part on each of the plurality of cloud-computing edge devices being previously provisioned with encryption keys and a root certificate for the computing cluster;
generate, by a first cloud-computing edge device of the distributed control plane, a message comprising data related to control plane operations corresponding to a first resource of the cloud infrastructure resources of the computing cluster;
generate, by the first cloud-computing edge device of the distributed control plane and based at least in part on an encryption protocol and a first data encryption key of the encryption keys provisioned on the first cloud-computing edge device, an encrypted message from the message comprising the data related to the control plane operations corresponding to the first resource of the cloud infrastructure resources of the computing cluster;
authenticate, by the first cloud-computing edge device using the root certificate, a second cloud-computing edge device of the distributed control plane;
responsive to the authentication, transmit, by the first cloud-computing edge device to the second cloud-computing edge device of the distributed control plane, the encrypted message via the intra-node switch;
decrypt, by the second cloud-computing edge device using a second data encryption key of the encryption keys provisioned on the second cloud-computing edge device, the encrypted message to obtain the data related to the control plane operations corresponding to the first resource of the cloud infrastructure resources of the computing cluster; and based at least in part on obtaining the data related to the control plane operations that correspond to the first resource of the cloud infrastructure resources of the computing cluster, execute, by the second cloud-computing edge device, an operation for provisioning or managing the first resource of the cloud infrastructure resources of the computing cluster.

14. The non-transitory computer-readable storage medium of claim 13, wherein the plurality of cloud-computing edge devices are communicatively connected to a client switch, and further comprising additional instructions that, when executed by the one or more processors, cause the computing cluster to further:

receive, from the client switch at the first cloud-computing edge device, an additional message initiated from a client device, the additional message being encrypted with a second encryption protocol;

decrypt, by the first cloud-computing edge device and using the second encryption protocol, the additional message to obtain message data; and execute, by the first cloud-computing edge device, one or more operations based at least in part on the message data obtained.

15. The non-transitory computer-readable storage medium of claim 13, wherein the first data encryption key stored in a key storage at the first cloud-computing edge device, the first data encryption key encrypted with a third encryption protocol comprising a master key, the master key stored at a trusted platform module of the first cloud-computing edge device.

16. The non-transitory computer-readable storage medium of claim 15, further comprising additional instructions that, when executed by the one or more processors, cause the computing cluster to further:

retrieve, by the first cloud-computing edge device, the first data encryption key from the key storage; and decrypt, by the trusted platform module, the first data encryption key using the master key.

17. The non-transitory computer-readable storage medium of claim 13, wherein the encryption protocol is a media access control security protocol.

18. The computer-implemented method of claim 1, wherein the first data encryption key and the second data encryption key are the same.

19. The computing cluster of claim 7, wherein the first data encryption key and the second data encryption key are the same.

20. The non-transitory computer-readable storage medium of claim 13, wherein the first data encryption key and the second data encryption key are the same.

* * * * *